(12) United States Patent
Kangas et al.

(10) Patent No.: US 9,054,903 B2
(45) Date of Patent: Jun. 9, 2015

(54) SIGNAL EQUALIZATION WITH COMPENSATION FOR SCRAMBLING CODE CORRELATION

(75) Inventors: Ari Kangas, Lidingo (SE); Henrik Egnell, Uppsala (SE); Stephane Tessier, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/125,511

(22) PCT Filed: Jun. 10, 2011

(86) PCT No.: PCT/SE2011/050717
§ 371 (c)(1),
(2), (4) Date: Dec. 11, 2013

(87) PCT Pub. No.: WO2012/169948
PCT Pub. Date: Dec. 13, 2012

(65) Prior Publication Data
US 2014/0133542 A1   May 15, 2014

(51) Int. Cl.
| | |
|---|---|
| H04B 14/06 | (2006.01) |
| H04L 27/01 | (2006.01) |
| H04B 1/7105 | (2011.01) |
| H04B 1/712 | (2011.01) |
| H04B 1/7115 | (2011.01) |

(52) U.S. Cl.
CPC .............. *H04L 27/01* (2013.01); *H04B 1/7105* (2013.01); *H04B 1/712* (2013.01); *H04B 2201/709727* (2013.01); *H04B 1/7115* (2013.01)

(58) Field of Classification Search
CPC .......................................... H04B 2201/707272
See application file for complete search history.

(56) References Cited

U.S. PATENT DOCUMENTS 8,787,426 B2 * 7/2014 Wang et al. .................... 375/148
8,798,176 B2 * 8/2014 Cairns et al. ................... 375/260
(Continued)

FOREIGN PATENT DOCUMENTS

| CN | 101002409 A | 7/2007 |
| CN | 101282195 A | 10/2008 |

(Continued)

OTHER PUBLICATIONS

3rd Generation Partnership Project; Technical Specification Group Radio Access Network; Spreading and modulation (FDD) (Release 10), 3GPP TS 25.213 V10.1.0, 2010, 4 pages.

(Continued)

*Primary Examiner* — Santiago Garcia
(74) *Attorney, Agent, or Firm* — Rothwell, Figg, Ernst & Manbeck, P.C.

(57) ABSTRACT

A method for equalizing a received radio signal in a WCDMA system, comprises receiving (210), in a radio receiver, of a digital radio signal spread by scrambling codes. A channel estimation is performed (230) on the received digital radio signal for a plurality of channels. The received digital radio signal is in an equalizer equalized (240) into an equalized digital radio signal. This equalizing is performed by combining a plurality of part signals, deduced from the digital radio signal, with a respective delay and a respective combining weight. The equalizing (240) comprises provision of the combining weights based on a signal impairment matrix having elements compensated for systematic colouring caused by said scrambling codes.

18 Claims, 10 Drawing Sheets

(56) References Cited

U.S. PATENT DOCUMENTS

| | | | |
|---|---|---|---|
| 8,811,453 B2* | 8/2014 | Nas et al. | 375/148 |
| 2003/0227960 A1* | 12/2003 | Papasakellariou | 375/147 |
| 2004/0032848 A1* | 2/2004 | Papasakellariou | 370/342 |
| 2008/0080646 A1* | 4/2008 | Bottomley et al. | 375/341 |
| 2008/0095279 A1* | 4/2008 | Reial et al. | 375/343 |
| 2008/0101443 A1* | 5/2008 | Lindoff et al. | 375/148 |
| 2008/0304554 A1* | 12/2008 | Fulghum et al. | 375/149 |
| 2009/0257477 A1* | 10/2009 | Khayrallah et al. | 375/148 |

FOREIGN PATENT DOCUMENTS

| | | |
|---|---|---|
| GB | 2009065446 A1 | 5/2009 |
| GB | 2 457 810 A | 9/2009 |
| WO | 2005096518 A1 | 10/2005 |
| WO | 2009065446 A1 | 5/2009 |
| WO | 2009121795 A2 | 10/2009 |

OTHER PUBLICATIONS

3rd Generation Partnership Project; Technical Specification Group Radio Access Network; Spreading and modulation (FDD) (Release 8), 3GPP TS 25.213 V8.4.0, 2009; 36 pages.
Office Action dated Oct. 30, 2014, issued in Chinese Patent Application No. 201180071428.X, 7 pages.
Office Action dated Oct. 30, 2014, issued in Chinese Patent Application No. 201180071428.X, 14 pages.
Supplemental Search Report dated Oct. 7, 2014, issued in European Patent Application No. 11867302.9, 4 pages.
Communication pursuant to Article 94(3) EPC dated Oct. 16, 2014, issued in European Patent Application No. 11867302.9, 4 pages.
Nokia: "Beta factors for PAR analysis", 3GPP Draft; R1-031209, 3rd Generation Partnership Project (3GPP), Mobile Competence Centre; vol. RAN WG1, no. Lisbon, Portugal; Nov. 19, 2003, 10 pages.

* cited by examiner

SIGNAL EQUALIZATION WITH COMPENSATION FOR SCRAMBLING CODE CORRELATION

CROSS REFERENCE TO RELATED APPLICATION(S)

This application is a 35 U.S.C. §371 National Phase Entry Application from PCT/SE2011/050717, filed Jun. 10, 2011, designating the United States, the disclosure of which is incorporated herein in its entirety by reference.

TECHNICAL FIELD

The present invention relates in general to methods and devices for equalization of received digital radio signals and in particular to such methods and devices in wideband code division multiple access communication systems.

BACKGROUND

In Wideband Code Division Multiple Access (WCDMA), the traditional way to demodulate a signal is to apply a Rake type of receiver. A Rake receiver combines energy received at different delays and from different antennas. This is done by despreading the data at the delays where significant amounts of energy can be found. The combining weights are typically directly determined from the channel estimates so that each despread path, a so-called Rake finger, is given a weight equal to the conjugated channel response at that delay. Rake receivers work well when the spreading factors are large, so that there is little correlation between the different Rake fingers.

With the introduction of Enhanced uplink (EUL) spreading factors (SF) as low as 2 are used, meaning that significant correlation may exist between different Rake fingers. In these scenarios the achievable rate is limited by self interference and multi user interference. For these situations, so-called Generalized Rake (GRake) receivers were designed. The GRake method estimates the correlations between Rake fingers and uses this correlation to modify the weights. Furthermore, with GRake there is also an option to define so-called interference suppression fingers that does not contain signal energy but can be used to suppress interference. The GRake correlations, or equivalently, the impairment matrix, can be estimated in several ways. The so-called parametric GRake utilizes knowledge of the used scrambling codes and channelization codes to derive code averaged weights. As input to the model, despread data from the pilot channel, the Dedicated Physical Control CHannel (DPCCH), is used. Another flavour of GRake, also often referred to as non-parametric GRake, uses an unused channelization code to estimate the impairment.

The parametric GRake method is known to perform well in suppressing self-interference from one user transmitting at very high rate with one user scenarios. This is especially true in DownLink (DL). The parametric GRake was first developed for DL and later modified for the UpLink (UL), where the performance also has been verified to be acceptable. The non parametric GRake has also shown very promising performance in UL simulations and also in tests in real hardware. However, in certain UL situations, the gain performance has been found to be somewhat less than expected. This has particularly been found in some situations where strong signal channels are separated by approximately one chip.

SUMMARY

A general object of the present invention is to improve signal equalization in wideband code division multiple access communication systems. This object is achieved by methods and devices according to the attached independent claims. Preferred embodiments are defined by the dependent claims. In general words, in a first aspect, a method for equalizing a received radio signal in a WCDMA system, comprises receiving, in a radio receiver, of a digital radio signal spread by scrambling codes. A channel estimation is performed on the received digital radio signal for a plurality of channels. The received digital radio signal is in an equalizer equalized into an equalized digital radio signal. This equalizing is performed by combining a plurality of part signals, deduced from the digital radio signal, with a respective delay and a respective combining weight. The equalizing comprises provision of the combining weights based on a signal impairment matrix having elements compensated for systematic colouring caused by said scrambling codes. In a second aspect, a radio receiver arrangement in a WCDMA system comprises a radio receiver and an equalizer, connected to the radio receiver. The radio receiver is configured for receiving a digital radio signal spread by scrambling codes. The equalizer comprises an equalizer core, a channel estimator and a combining weight estimator. The equalizer core is configured for combining a plurality of part signals, deduced from the digital radio signal, with a respective delay and a respective combining weight, into an equalized digital radio signal. The combining weight estimator is configured for providing the combining weights to the equalizer core. The combining weights are based on a signal impairment matrix having elements compensated for systematic colouring caused by the scrambling codes.

In a third aspect, a base station comprises a radio receiver arrangement according to the second aspect.

One advantage with the present invention is that the general performance of equalization in WCDMA systems is improved. Other advantages are discussed in connection with the detailed description of the different embodiments below.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

Figure 1:
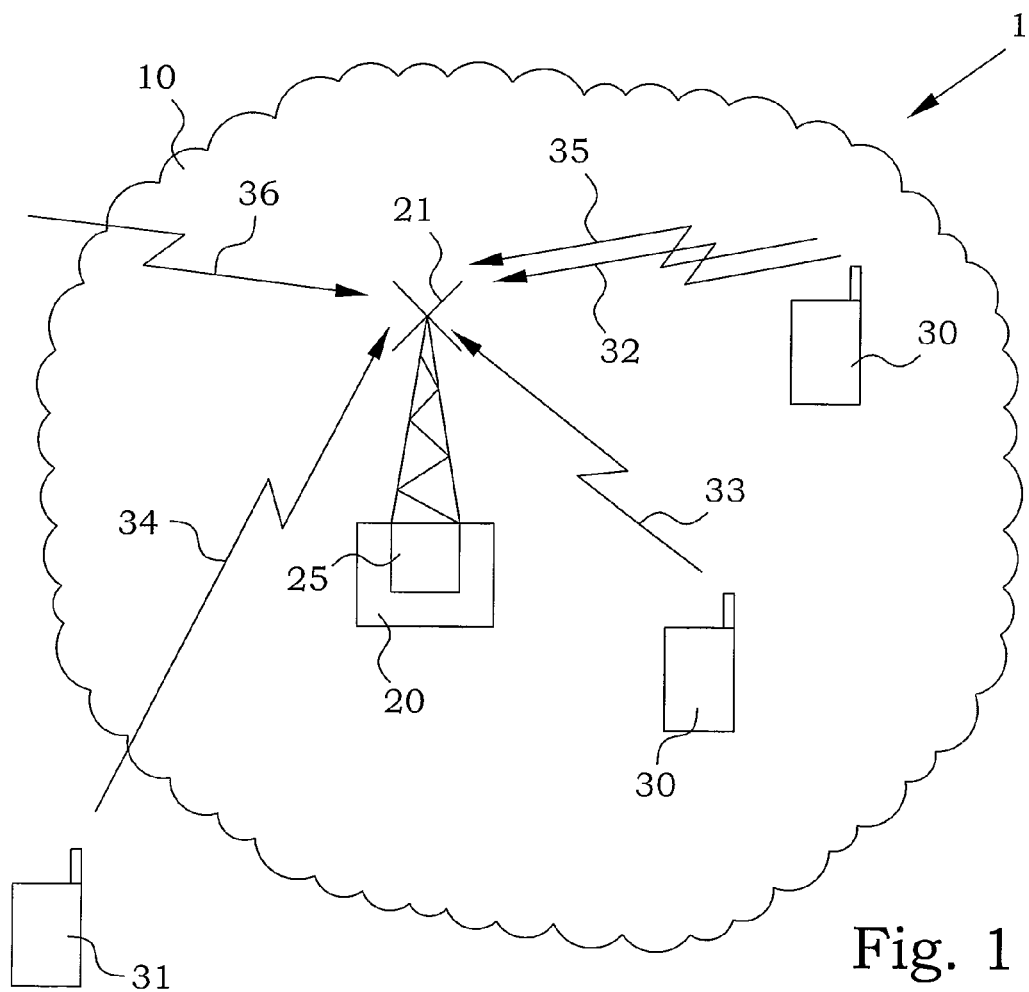
FIG. 1 is a schematic illustration of a WCDMA communication system.

FIG. 1 illustrates a wireless communication system 1, having a Node B 20 with an antenna 21 serving a cell 10. A number of User Equipments (UE) 30 are present within the cell 10. Other UEs 31, connected to other Node B's may also be present in the vicinity of the cell 10. In the UL, many types of signals are present. The UEs 30 send e.g. data signals 32, 33 to the Node B 20 and may also send different control data signals 35. Furthermore, radio signals 34 from UEs outside the cell 10 may interfere as well as other types of external interfering signals 36.

In a direct spread code division multiple access (DS-CDMA) system, different spreading codes are used for distinguishing the different signals. Typically, the spreading code comprises a channelization code, which is unique for each type of data channel. Channels, such as DPCCH, Enhanced DPCCH (E-DPCCH) and Enhanced Dedicated Physical Data CHannel (E-DPDCH) in WCDMA, have their respective channelization codes in order to be able to distinguish different types of data from one and the same UE. The spreading code also comprises a scrambling code, which is intended to separate signals from different users. Each user has its own scrambling code, enabling the receiving Node B to separate radio signals from different UEs. To this end, the desired UL signal to be sent is spread in the UE by the scrambling codes and channelization codes before transmission, and the received UL radio signals are despread in the Node B, regaining the desired signal.

The transmitted radio signal also typically propagates in different paths, so-called multipath propagation. Each path that does not propagate directly between the transmitter and receiver will have an associated delay, compared to a direct path. The received radio signal will therefore be a combination of path signals separated in time.

The radio signal may also be transmitted and/or received by a multitude of antennas. This will further increase the number of paths between the transmitting and receiving party.

A first approach to account for such multipath signals was the Rake reception, in which a number of "fingers" were assigned to the different paths and the delay and weight of each finger was controlled to be combined into one common received signal. The weights were adapted to correspond to the different channel coefficients estimated by the channel estimator. Later the Generalised Rake (GRake) was developed to determine combining weights by a maximum-likelihood approach and finger placement strategy, i.e. the delays, and is based on maximizing output signal-to-interference-and-noise ratio (SINR).

These equalization procedures are typically performed in an equalizer 25 provided in the Node B 20.

Parametric GRake utilizes knowledge of the used scrambling codes and channelization codes to derive code averaged weights. However, the assumptions used in standard WCDMA when performing code averaging has turned out not to be perfectly true. The UL long scrambling code used in WCDMA has been found not to be completely random. The second and fourth order moments of a random code would be characterized by e.g. (the list is non-exhaustive) the conditions:

$$E(C(m_1)C^*(n_2)) = \delta(m_1 - n_2) \quad (1a-c)$$

$$E(C(m_1)C(n_2)) = 0$$

$$E(C(m_1)C^*(n_2)C(m_2)C^*(n_1)) = \begin{cases} 1, m_1 = n_2, m_2 = n_1 \\ 0, \text{otherwise} \end{cases}$$

This is true for most scrambling codes used in cellular standards. However, it has now been identified one notable exception in the long UL scrambling code used in WCDMA.

UL Long Scrambling Sequence

The following description of the UL scrambling sequence is mainly taken from the standard 3GPP TS 25.213, Spreading and modulation, v3.4.0 (2000-12). The long scrambling sequences $c_{long,1,u}$ and $c_{long,2,u}$ are constructed from position wise modulo 2 sum of 38400 chip segments of two binary m-sequences generated by means of two generator polynomials of degree 25. Let x, and y be the two m-sequences, respectively. The x sequence is constructed using the primitive (over GF(2)) polynomial $X^{25}+X^3+1$. The y sequence is constructed using the polynomial $X^{25}+X^3+X^2+X+1$. The resulting sequences thus constitute segments of a set of Gold sequences.

The sequence $c_{long,2,u}$ is a 16777232 chip shifted version of the sequence $c_{long,1,u}$.

Let $u_{23} \ldots u_0$ be the 24 bit binary representation of the scrambling sequence number u with $u_0$ being the least significant bit. The x sequence depends on the chosen scrambling sequence number u and is denoted $x_u$, in the sequel. Furthermore, let $x_u(m)$ and $y(m)$ denote the m:th symbol of the sequence $x_u$ and y, respectively. The m-sequences $x_u$ and y are constructed as:

Initial conditions:

$$x_u(0)=u_0, x_u(1)=u_1, \ldots x_u(22)=u_{22}, x_u(23)=u_{23}, x_u(24)=1. \quad (2a)$$

$$y(0)=y(1)=\ldots=y(23)=y(24)=1. \quad (2b)$$

Recursive definition of subsequent symbols:

$$x_u(m+25)=x_u(m+3)+x_u(m) \bmod 2, m=0,\ldots,2^{25}-27. \quad (3a)$$

$$x_u(m+25)=x_u(m+3)+x_u(m+2)+x_u(m+1)+x_u(m) \bmod 2, m=0,\ldots,2^{25}-27. \quad (3b)$$

Define the binary Gold sequence $z_u$ by:

$$z_u(m)=x_u(m)+y(m) \bmod 2, m=0,\ldots,2^{25}-2. \quad (4)$$

The real valued Gold sequence Z is defined by:

$$Z_u(m) = \begin{cases} +1 & \text{if } z_u(m) = 0 \\ -1 & \text{if } z_u(m) = 1 \end{cases} \text{ for } m = 0, 1, \ldots, 2^{25}-2. \quad (5)$$

Now, the real-valued long scrambling sequences $c_{long,1,u}$ and $c_{long,2,u}$ are defined as follows:

$$c_{long,1,u}(m)=Z_u(m), m=0,1,2,\ldots,2^{25}-2 \quad (6)$$

and $$c_{long,2,u}(m)=Z_u((m+16777232) \bmod (2^{25}-1)), m=0,1,2,\ldots,2^{25}-2. \quad (7)$$

Finally, the complex-valued long scrambling sequence $C_u$ is defined as:

$$C_u(m)=c^{long,1,u}(m)(1j(-1)^m c_{long,2,u}(2\lfloor m/2 \rfloor)) \quad (8)$$

where m=0, 1, ..., $2^{25}$=2 and $\lfloor \ \rfloor$ denotes rounding to nearest lower integer.

Figure 2:
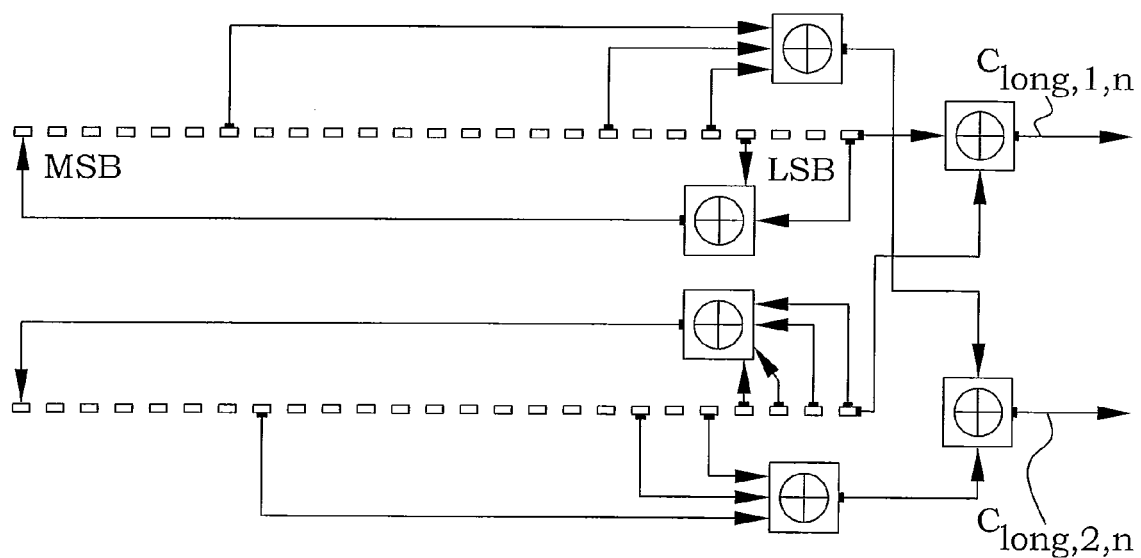
FIG. 2 is a schematic illustration of the generation of scrambling codes in WCDMA.

FIG. 2 illustrates a configuration of an uplink scrambling sequence generator.

An interesting correlation property of the UL scrambling code (8) will now be illustrated. In the following, note that $c_{long,1,u}(m)$ and $c_{long,2,u}(m)$ is either −1 or +1.

$$(C_u(2m))^2(C_u(2m+1))^{2^*} = = c_{long,1,u} * (2m)^2 c_{long,1,u}(2m+1)^2 \quad (9)$$

$$(1 + j(-1)^{2m} c_{long,2,u}(2\lfloor 2m/2 \rfloor))^2$$

$$(1 + j(-1)^{2m+1} c_{long,2,u}(2\lfloor 2m+1/2 \rfloor))^{2^*} =$$

$$= (1 + jc_{long,2,u}(2\lfloor 2m/2 \rfloor))^2$$

$$(1 - jc_{long,2,u}(2\lfloor 2m/2 \rfloor))^{2^*} =$$

$$= (2jc_{long,2,u}(2\lfloor 2m/2 \rfloor))$$

$$(-2jc_{long,2,u}(2\lfloor 2m/2 \rfloor))^* = -4$$

To summarize, it has been found that:

$$C(2m)^2 C(2m+1)^{2^*} = -4$$

$$C(2m+1)^2 C(2m)^{2^*} = -4 \quad (10a\text{-}b)$$

Note that the user index u is dropped since the property is valid for all code numbers. For later convenience the conjugated version was also added.

The properties (1a-c) have previously been used to derive code-averaged weights in receiver schemes like the parametric GRake schemes. To our knowledge the properties (10a-b) has not previously been utilized when designing optimal UL receiver weights. Below, it will be shown how the properties (10a-b) can be utilized to derive modified receiver weights for e.g. the parametric GRake as well as for non parametric GRake and chip level Linear Minimum Mean Square Error (LMMSE) equalization.

Figure 3:
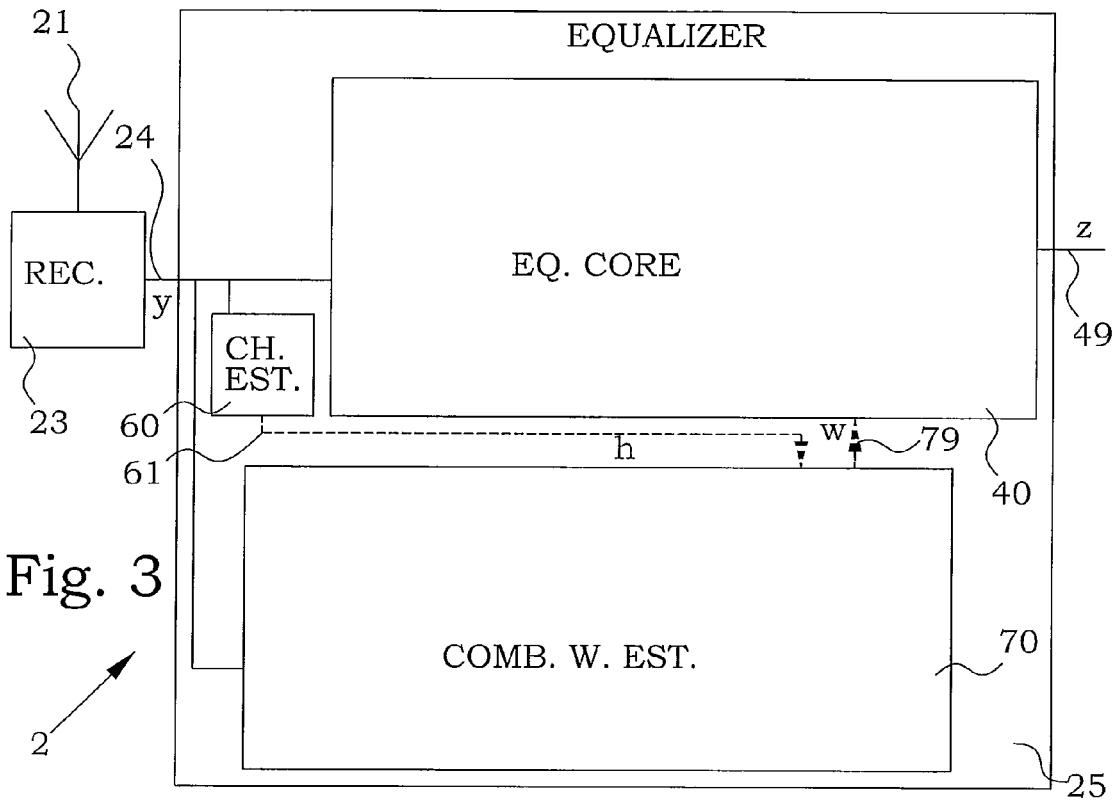
FIG. 3 is a block diagram of an embodiment of a radio receiver arrangement.

FIG. 3 illustrates an embodiment of a general radio receiver arrangement 2 in a WCDMA system. The radio receiver arrangement 2 comprises a radio receiver 23, which is configured for receiving a digital radio signal 24 spread by scrambling codes. An equalizer 25 is connected to the radio receiver 23. The equalizer 25 comprises an equalizer core 40, a channel estimator 60 and a combining weight estimator 70. The channel estimator 60 operates according to any conventional channel estimation principle, providing channel estimates h, which are provided to the combining weight estimator 70. The equalizer core 40 is configured for combining a plurality of part signals, deduced from the digital radio signal 24, with a respective delay and a respective combining weight w, resulting in an equalized digital radio signal z. The combining weight estimator 70 is configured for providing the combining weights w to the equalizer core 40. The combining weights w are based on a signal impairment matrix having elements compensated for systematic colouring caused by the scrambling codes.

In an embodiment of a radio receiver arrangement, the combining weight estimator is configured for compensating the elements in the impairment matrix for fourth order moments of the scrambling codes.

Figure 4:
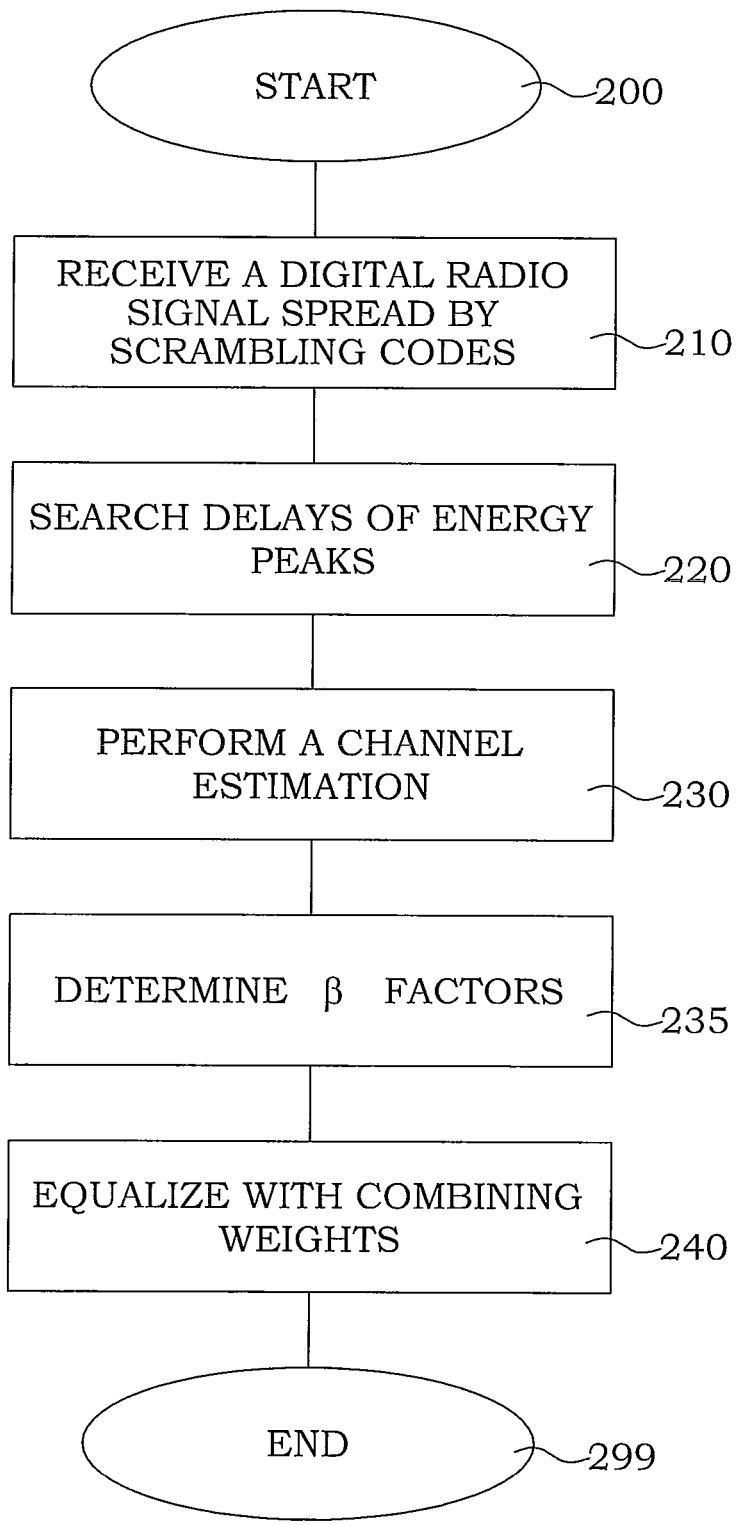
FIG. 4 is a flow diagram of steps of an embodiment of an equalizing method.

FIG. 4 illustrates a flow diagram of steps of an embodiment of a method for equalizing a received radio signal in a WCDMA system. The method starts in step 200. In step 210, a digital radio signal spread by scrambling codes is received in a radio receiver. In step 220, delays of energy peaks of the received digital radio signal are searched, which correspond to respective delays for a plurality of channels. This step can, as discussed above, be omitted. Presently, it is believed that it is advantageous to incorporate the step 220. In step 230, a channel estimation is performed on the received digital radio signal for a plurality of channels. In step 235, β factors of the received digital radio signal are determined. This can in standard WCDMA be performed by utilizing information in the E-DPCCH channel. This step may, however, in certain embodiments be excluded, e.g. for the parametric GRake with approximated corrections, discussed here below. The received digital radio signal is equalized in step 240, in an equalizer, into an equalized digital radio signal. The equalizing is performed by combining a plurality of part signals, deduced from the digital radio signal, with a respective delay and a respective combining weight. The step 240 of equalizing comprises provision of the combining weights based on a signal impairment matrix having elements compensated for systematic colouring caused by the scrambling codes. The procedure ends in step 299.

In a detailed embodiment, a parametric GRake system will be discussed. Most of the mathematical derivation is collected in Appendix A further below, for detail references.

A basic signal model is defined by the equations (A1) and (A2). A simplified example of a set of GRake equations are then presented in connection to equations (A3) to (A8). The optimal estimator defined in (A8) defines the weights for the different received part signals as:

$$w = SF_c \beta_c h^* R_u^{-1}, \quad (11)$$

By use of the traditionally considered scrambling code properties (1a-d), a covariance $R_c$ for a despread DPCCH symbol can be expressed as (c.f. A15):

$$R_c(f_1, f_2) = \quad (12)$$
$$SF_c(\beta_c^2 + \beta_{ec}^2 + \beta_{ed,sf2}^2 + \beta_{ed,sf4}^2) R_{ran}(f_1, f_2) = SF_c N_0 R_n(f_2 - f_1)$$

$$R_{ran}(f_1, f_2) = \sum_{\substack{m=-\infty \\ m \neq 0}}^{\infty} h^a(f_1 + mT) h^{b^*}(f_2 + mT) \quad (13)$$

where $N_0$ is the noise spectral density and $R_n$ represents the covariance between noise of different fingers.

If also the newly considered colouring properties (10a-b) of UL scrambling codes are taken into account, the GRake equation will change somewhat. The covariance $R_c$, for a despread DPCCH symbol can then be expressed as (c.f. A23):

$$R_c(f_1, f_2) = SF_c(\beta_c^2 + \beta_{ec}^2 + \beta_{ed,sf2}^2 + \beta_{ed,sf4}^2) R_{ran}(f_1, f_2) +$$
$$SF_c N_0 R_n(f_2 - f_1) \pm SF_c(0.5\beta_c^2 + 0.5\beta_{ec}^2 - 0.5\beta_{ed,sf2}^2 +$$
$$0.5\beta_{ed,sf4}^2) R_{ul}(f_1, f_2) \quad (14)$$

$$R_{ul}(f_1, f_2) = h^a(f_1 + T) h^{b^*}(f_2 - T) + h^a(f_1 - T) h^{b^*}(f_2 + T) \quad (15)$$

Due to the differing signs in front of the different factors, different corrections should be applied for different usage of control and data channels.

The channel responses are assumed to be known by a channel estimation procedure. The details of such a channel estimation can be performed according to any prior art methods known by anyone skilled in the art and are not believed to be of any particular importance for the technical effect of the present invention. Such channel estimation is therefore not further discussed.

By the received channel signal corresponding to a pre-known pilot signal, the weights of the different received part signals can be determined, i.e. basically the covariance matrix. This is performed according to typical standard GRake principles, known as such in prior art. A total energy and noise power can also be obtained using the results of any of (A28)-(A30), whichever is applicable.

From the equation (11), the weights for the data channel can be computed, using equations (A32) to (A36).

As a summary, the parametric GRake equations are modified to take into account the so far neglected properties of the UL long scrambling code. Different model equations are needed depending on if only SF4 or SF2 is used or a combination of 2SF2+2SF4. The despreading of the data channel s, e.g. E-DPDCH, should apply different impairment matrices, i.e. different weights, for SF2 and SF4, respectively.

Figure 5:
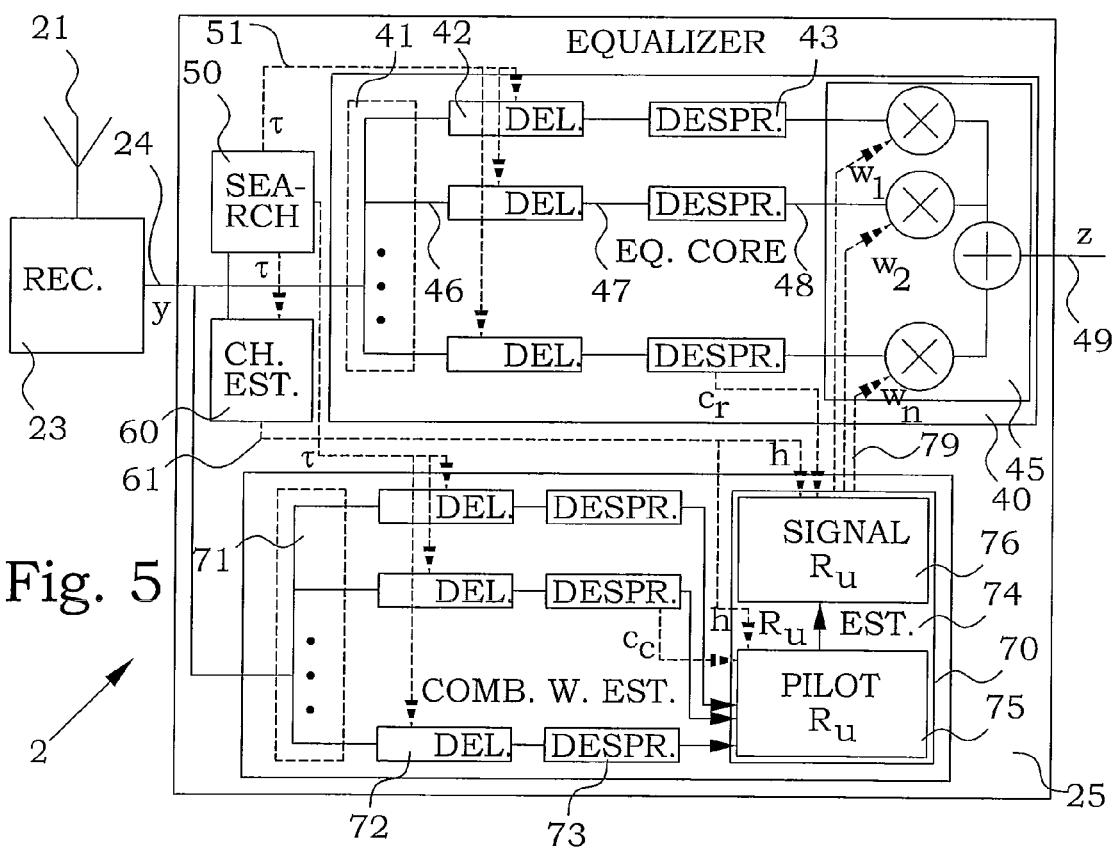
FIGS. 5 and 6 are block diagram of other embodiments of a radio receiver arrangement using parametric GRake symbol-level equalizing.

In the embodiment of FIG. 5, the equalizer 25 is a symbol-level equalizer. This means that the actual equalizing is performed on despread digital radio signals, i.e. on entire symbols. To this end, the equalizer core 40 comprises a divider 41. The divider 41 is configured for dividing the received digital signal 24 in a plurality of part signals 46. A delay filter 42, comprised in each branch of the equalizer core 40 delays each part signal by a respective delay into delayed part signals 47. In this embodiment, the respective delays are provided by the channel searcher 50. The delay filters 42 can be provided as separate filters or as a common filter for all branches, but with varying delays. A despreader arrangement 43 is configured for despreading each delayed part signal 47 into a symbol-level part signal 48 by a spreading code. The despreader arrangement 43 can be provided as separate arrangements or as a common arrangement for all branches. The equalizer core 40 also comprises a combiner 45, which combines the symbol-level part signals 48 with the respective combining weights w into the equalized digital radio signal 49. This is illustrated in the figure by a plurality of scalers and an adder.

In the present embodiment, the combining weight estimator 70 is provided with the received digital signal 24. Analogously to the equalizer core, the received digital signal 24 is divided into a plurality of part signals in a divider 71 and delayed by delay filters 72. The combining weight estimator 70 further comprises an estimator despreader 73, configured for despreading each part signal with a second spreading code of a control channel comprising a pilot signal. The combining weight estimator 70 further comprises an impairment matrix estimator 74 configured for, in a pilot impairment matrix section 75, estimating a pilot impairment matrix. With the "pilot impairment matrix" is here to be understood an impairment matrix estimated based on the pilot signal of the control channel. The pilot impairment matrix has elements compensated for systematic colouring caused by the scrambling codes. The impairment matrix estimator 74 of the combining weight estimator 70 is further configured for, in a signal impairment matrix section 76, modifying the pilot impairment matrix into the signal impairment matrix in dependence on the first and second spreading factors. The channel estimates h are provided to the impairment matrix estimator 74 from the channel estimator 60 and an identification of the first channel c to which the equalization is to be performed is received from the despreader arrangement 43. The impairment matrix estimator 74 of the combining weight estimator 70 is thus able to provide the combiner 45 of the equalizer core 40 with appropriate combining weights $w_1$-$w_n$.

Figure 6:
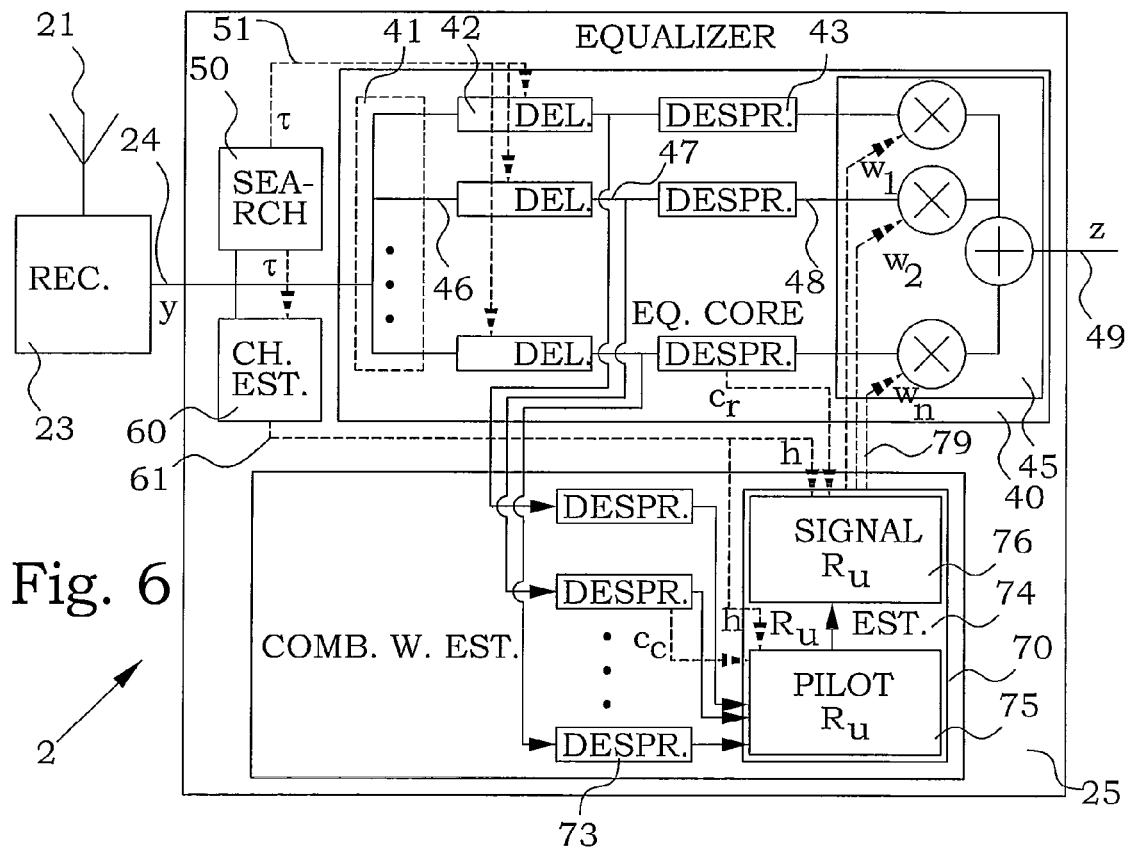

FIG. 6 illustrates another embodiment of a radio receiver arrangement 2 in a WCDMA system according to the GRake approach. In this embodiment, the combining weight estimator 70 makes use of the division and delay provided for in the equalizer core 40 and received a plurality of delayed part signals 47. These delayed part signals are subsequently despread by an estimator despreader 73, configured for despreading each part signal with a second spreading code of a control channel comprising a pilot signal.

Figure 7:
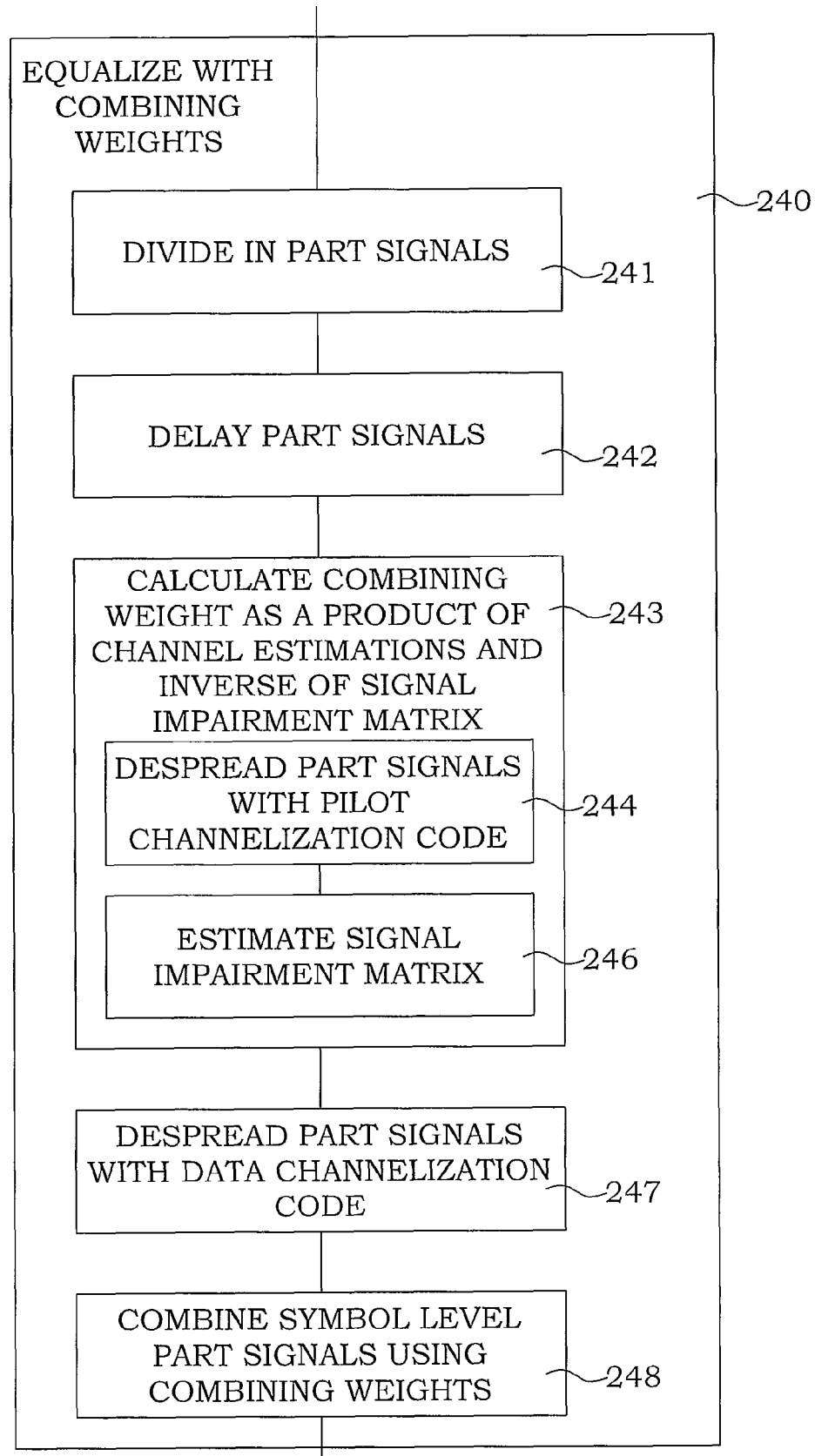
FIG. 7 is a flow diagram of steps of an embodiment of an equalizing step of an equalizing method using parametric GRake symbol-level equalizing.

FIG. 7 illustrates an embodiment of the equalizing step 240 (of FIG. 4) for a symbol-level equalizing method based on GRake. In step 241, the received digital signal is divided in the plurality of part signals. Each part signal represents a respective channel of the plurality of channels. Each part signal is in step 242 delayed by the respective delay into delayed part signals. In step 243 the respective combining weights are calculated as a product of the channel estimations and an inverse of the signal impairment matrix.

In this embodiment, the step 243 of calculating comprises the step 245 of despreading each part signal with a second spreading code of a control channel comprising a pilot signal. The calculating further comprises a step 246 of estimating a pilot impairment matrix having elements compensated for systematic colouring caused by the scrambling codes and of modifying the pilot impairment matrix into the signal impairment matrix in dependence on the first and second spreading factors.

In step 247, each part signal is despread into a symbol-level part signal by a first spreading code. The symbol-level part signals are in step 248 combined with the respective combining weights into the equalized digital radio signal.

As briefly mentioned in the background, another flavour of GRake, also often referred to as non-parametric GRake, uses an unused channelization code to estimate the impairment. The non-parametric GRake has shown very promising performance, particularly in the UL. However, the anomaly of the UL scrambling codes, discussed further above does also affect this approach.

In another detailed embodiment, a non-parametric GRake system will be discussed. Most of the mathematical derivation is collected in Appendix B further below, for detail references.

Divide the set of channelization codes into two sub-trees:

$$\text{OVSF}=\text{OVSF}(\text{``}11\text{''})\cup\text{OVSF}(\text{``}1-1\text{''}). \quad (16)$$

They will be referred to as the first and second sub-tree, respectively. The importance here is that the first sub-tree contains the control channels and most of the data channels, as for example SF4.1. It also contains unused codes, e.g. codes 16.1 and 16.3 (of 3GPP TS 25.213, Spreading and modulation, v3.4.0 (2000-12)), used to estimate the impairment matrix. The second sub-tree e.g. contains the channelization code SF2.1, which is most sensitive to interference.

A new expression for the impairment matrix is derived in Appendix B. This expression depends on the spreading code on the sent data and the spreading code used in the despreading. The method compensates for incorrect estimates of the impairment matrix.

If the impairment matrix is estimated in one of the channelization sub-trees utilizing an unused code, and used in the GRake+ with a channelization code from the other sub-tree, then the impairment matrix should be corrected with a factor $R_e^{corr}$ (c.f. B16):

$$R_e^{corr}(f_1, f_2) = -\left(h_{f_1+1}h^*_{f_2-1} + h_{f_1-1}h^*_{f_2+1}\right)\frac{1}{SF_{c_t}}\sum_i \text{sign}(c_r, c_t^i)\beta_i^2. \quad (17)$$

Here $\{c_t^i, \beta^{i2}\}_i$ are the channelization codes and beta factors for the different data channels from the UE of interest, $h_m$ is the channel and $c_r$ is the channelization code used in the GRake+ receiver or as the unused code in the impairment estimator. The function sign($c_r,c_t$) is one if the codes $c_r,c_t$ are from the same OSVF sub-tree and −1 otherwise.

The result extends easily to several antennas:

$$(R_e^{\alpha,\beta})^{corr}(f_1, f_2) = \tag{18}$$
$$-\left(h_{f_1+1}^\alpha (h_{f_2-1}^\beta)^* + h_{f_1-1}^\alpha (h_{f_2+1}^\beta)^*\right) \frac{1}{SF_{c_r}} \frac{1}{SF_{c_t}} \sum_i \text{sign}(c_r, c_t^i)\beta^{i2}$$

where α and β are antenna indices.

The impairment matrix is thus estimated using an unused code.

When the impairment matrix is to be used to compute the non-parametric GRake weights for data despread with a code from the other OSVF sub-tree, then the impairment matrix has to be compensated to give the correct values. In practical non-parametric GRake, this applies among other examples to the important case where the impairment is estimated using code 16.3 and/or 16.1, and the data is despread from the other sub-tree using e.g. code 2.1.

Figure 8:
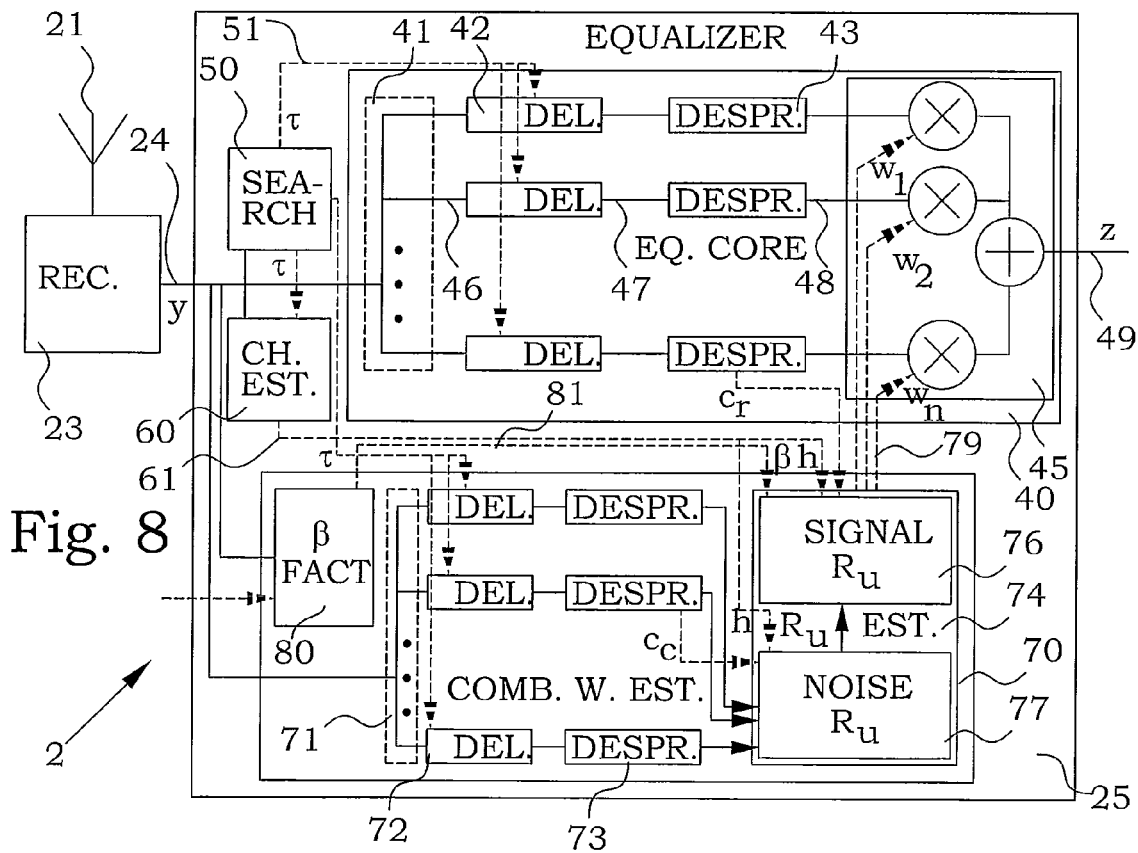
FIGS. 8 and 9 are block diagram of other embodiments of a radio receiver arrangement using non-parametric GRake symbol-level equalizing.

Since the non-parametric GRake equalizer is a symbol-level equalizer, a radio receiver arrangement in a WCDMA system according to the non-parametric GRake approach resembles to large parts the embodiment of FIG. 5. However, since the correction factors require knowledge of the β factors, some minor modifications have to be performed. FIG. 8 illustrates such a radio receiver arrangement 2 in a WCDMA system according to the non-parametric GRake approach.

A β factor determiner 80 is provided with the received signal 24. In the standard WCDMA, the E-DPCCH comprises a Retransmission Sequence Number (RSN), an Enhanced Dedicated Transport CHhannel (E-DCH) Transport Format Combination Index (E-TFCI) and a so-called "happy bit". The E-TFCI is an index to a table from which the number of information bits, the Transport Block Size (TBS), can be determined. There are more than one Transport format tables in the standard, so the NodeB is informed by the Radio Network Controller (RNC) about which table to be used. When the TBS has been determined, the NodeB can determine the number of physical channels and their spreading factors using a standardized algorithm. For the β factor calculation, the NodeB is informed by the RNC about the set of reference ETFCIs and gain factors for these reference E-TFCIs. The necessary information from the NodeB is illustrated by the broken input arrow. The β factors for a given E-TFCI are provided by extrapolation or interpolation from the reference E-TFCI that is closest but smaller than the given E-TFCI. Typically, the power is increased proportionally with the TBS. The β factors 81 are provided to the combining weight estimator 70 in this embodiment.

In this embodiment, the combining weight estimator 70 comprises an estimator despreader 73, configured for despreading each part signal with a second spreading code. However, now the second spreading code corresponds to an unused channel. The impairment matrix estimator 74 of the combining weight estimator 70 is now configured for estimating, in a noise impairment matrix section 77, a noise impairment matrix for an unused code. In analogy with the terminology used before, "noise impairment matrix" should be interpreted as an impairment matrix based on noise obtained by analysis of an unused channel. The noise impairment matrix for an unused code has elements compensated for systematic colouring caused by the scrambling codes. The impairment matrix estimator 74 of the combining weight estimator 70 is further configured for, in the signal impairment matrix section 76, modifying the noise impairment matrix for an unused code into the signal impairment matrix in dependence on the first and second spreading factors according to the above discussions. In other words, the correction factor $R_u^{corr}$ is to be added. In particular, the modification is made in dependence on whether the first and second spreading factors are present in a same orthogonal variable spreading factor sub-tree or not. The set of weights $w_1$-$w_n$ provided to the equalizer core 40 are thus one set out of two possible sets. The actual selection is made in dependence of the sub-tree to which the first spreading factor belongs, i.e. to which sub-tree the data channel spreading code belongs.

It can be noted that with incorporation of a β factor determiner also in the radio receiver arrangements of FIG. 5 or 6, the impairment matrix estimator 74 could be configured to use also β factors in its calculations. This would then mean that the approximations of (A29) and (A30) could be exchanged for the original expressions. However, this would also make the allover calculations and arrangements more complex.

Figure 9:
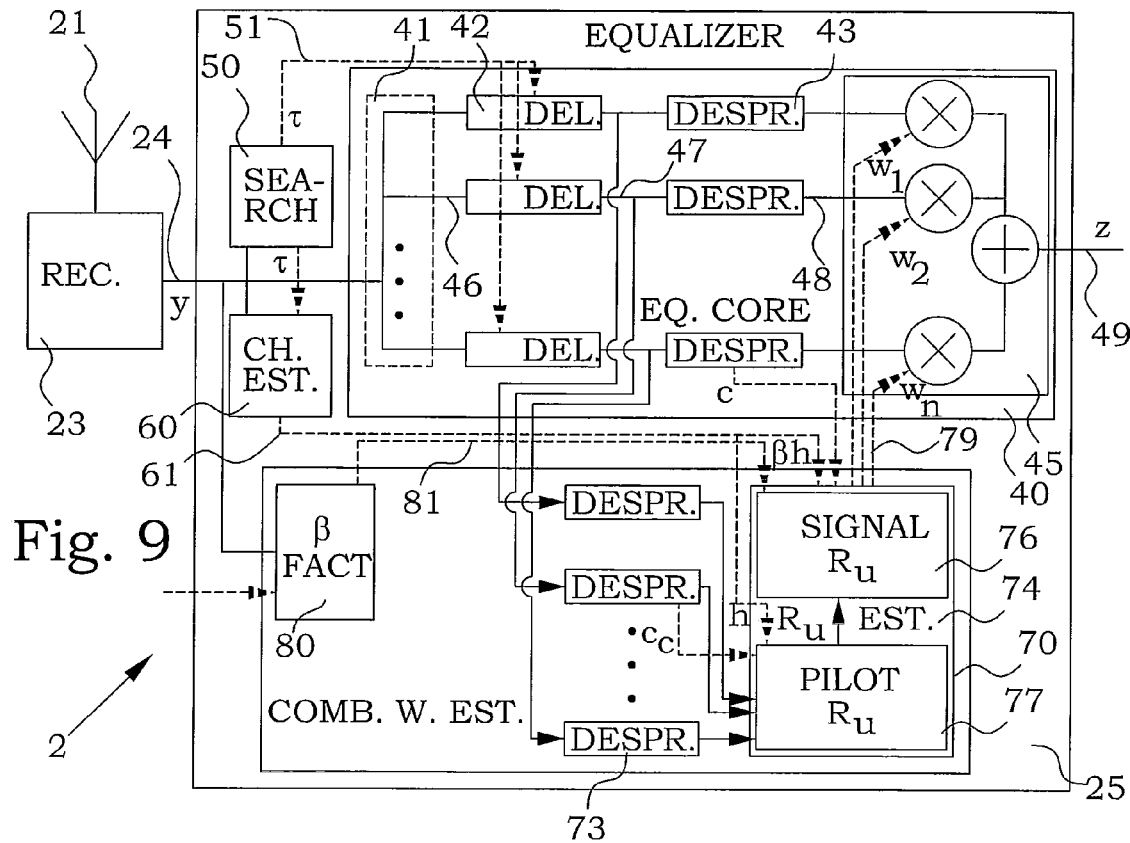

FIG. 9 illustrates another embodiment of a non-parametric GRake equalizer 25. This embodiment resembles FIG. 6, but with similar modifications as was presented in connection with FIG. 8.

Figure 10:
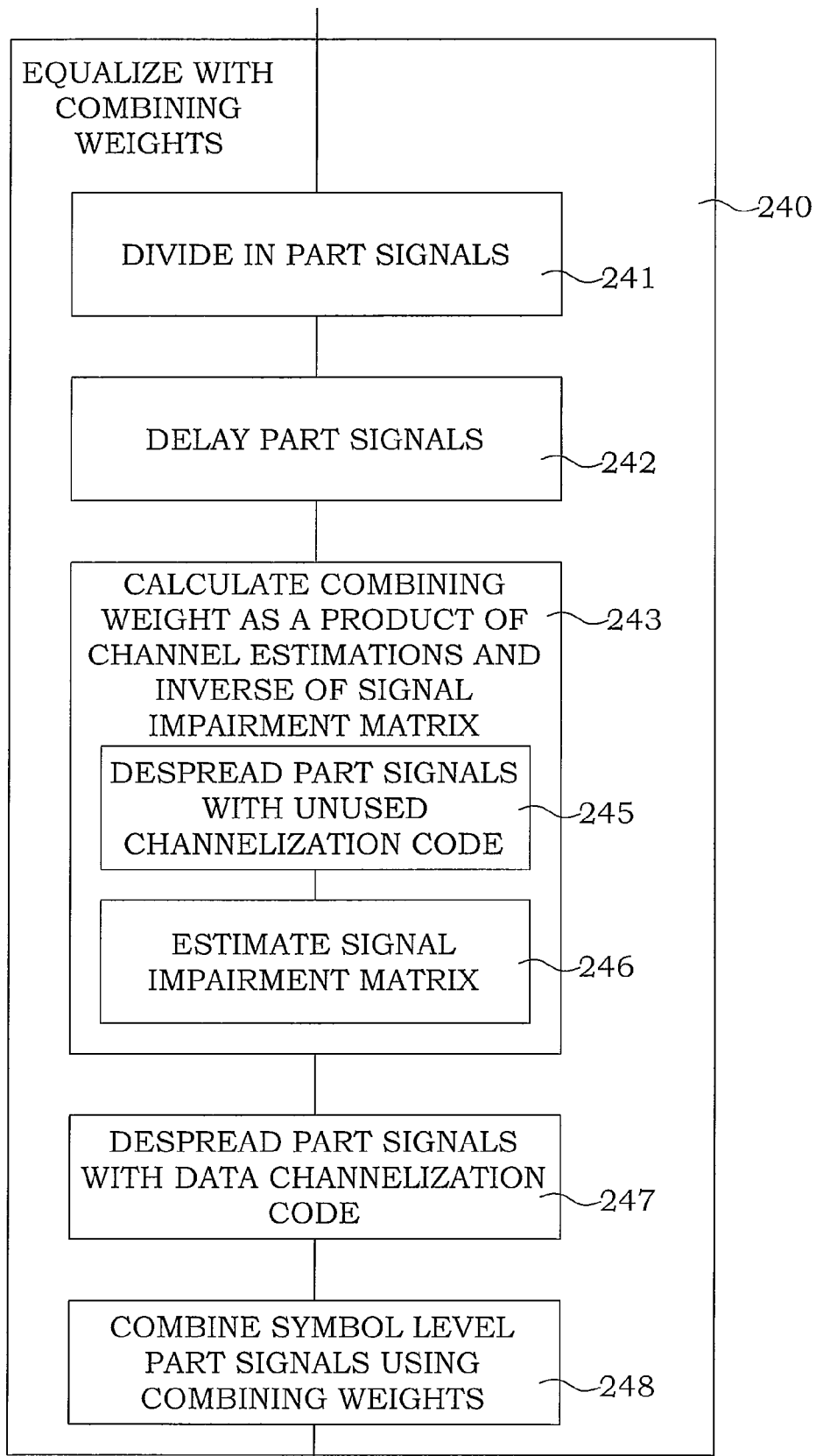
FIG. 10 is a flow diagram of steps of an embodiment of an equalizing step of an equalizing method using non-parametric GRake symbol-level equalizing.

FIG. 10 illustrates an embodiment of the equalizing step 240 (of FIG. 4) for a symbol-level equalizing method based on GRake. Steps 241 and 242 are basically the same as described in connection with FIG. 7. The basic features of step 243 is also still that the respective combining weights are calculated as a product of the channel estimations and an inverse of the signal impairment matrix.

In this embodiment, however, the step 243 of calculating comprises the step 245 of despreading each part signal with a second spreading code of an unused channel. The calculating further comprises the step 246 of estimating a noise impairment matrix having elements compensated for systematic colouring caused by the scrambling codes and of modifying the noise impairment matrix into the signal impairment matrix in dependence on the first and second spreading factors, in particular in dependence on whether the first and second spreading factors are present in a same orthogonal variable spreading factor sub-tree or not. These corrections do also use information about the channel estimates and the β factors.

In step 247, each part signal is despread into a symbol-level part signal by a first spreading code. The symbol-level part signals are in step 248 combined with the respective combining weights into the equalized digital radio signal.

An alternative to GRake that is used in WCDMA systems of today is a chip level LMMSE equalizer. In a chip level equalizer, a filtering before despreading replaces the GRake combining, so only a single correlator is needed. The most common approach for designing the weights of the chip equalization filter is a LMMSE approach, which minimizes the mean-square error between the output of the filter and the composite transmitted chip value.

The LMMSE has the advantage of only relying on the autocorrelation function of the antenna data, which is common for all users and easy to estimate. It has now been proven that the GRake receiver and the LMMSE receiver only differ by a scaling factor. However, that proof uses the assumption that the scrambling codes are completely random. This fact is not only needed for the second order momentum, but also on the fourth order momentum. Since, as discussed above, the UL scrambling codes have a strange correlation in the fourth order momentum, this has to be considered also in LMMSE.

During the actual LMMSE procedure, only the autocorrelation function of the antenna data is used. This means that only terms involving products of two scrambling codes appear in the calculations of the autocorrelation matrix $R_y$. Consequently, the weights for combining the different part signals in the LMMSE filter are also only dependent on a product of two scrambling codes. This thus means that there is no effect of the fourth order momentum correlations.

However, in the subsequent step, a despreading is performed for retrieving the symbols of the different channels. In this procedure, the fourth order momentum will appear and introduce anomalities due to the now found correlations. Such influence will furthermore be different for different channels and will also depend on the other channels present in the recovered signal. The best way to deal with such effects is to introduce a correction of the combination weights, dependent on the channel to be despread, i.e. before the despreading procedure.

The autocorrelation function is estimated using antenna chip samples. This is common for all users. For each user a correction $R_y^{corr}$ of the impairment matrix is computed to compensate for the correlation in the UL scrambling codes. The sign of the compensation depends on the channelization code tree that is used. The correction also depends on the UE channel estimates and beta factors. This is further explained in Appendix C, where equation (C3) describes the necessary corrections.

Figure 11:
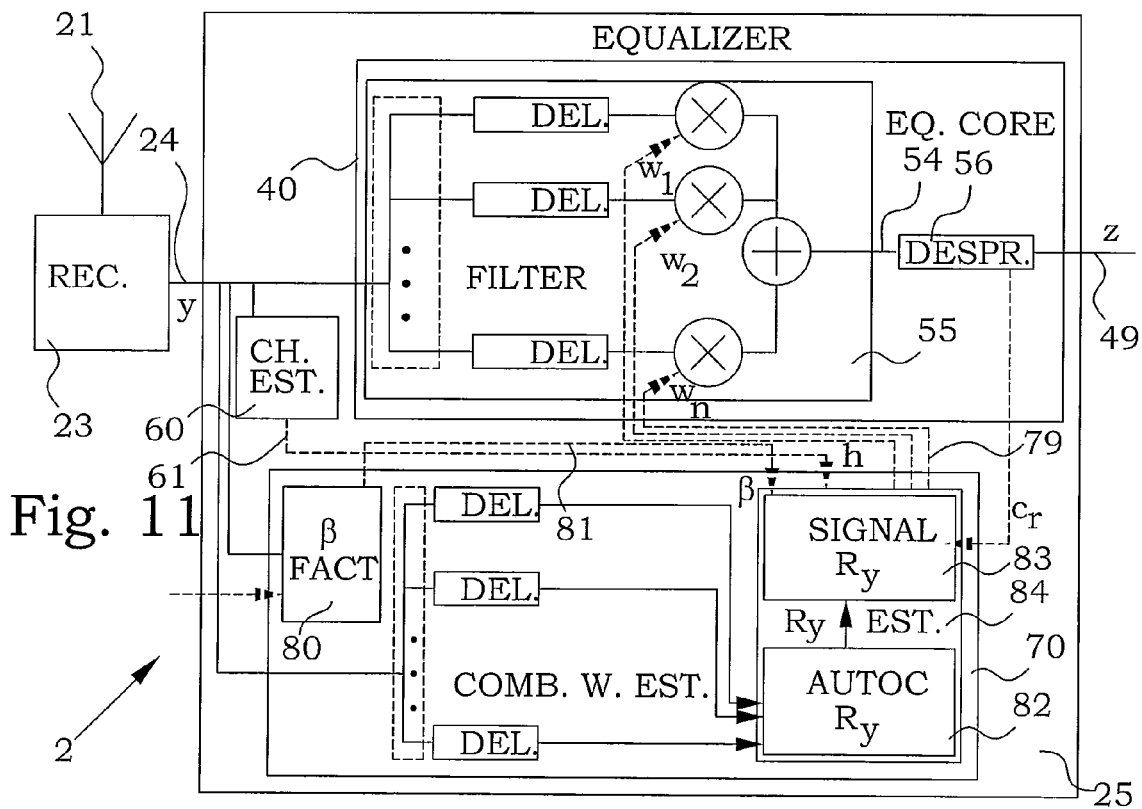
FIGS. 11 and 12 are block diagram of other embodiments of a radio receiver arrangement using chip-level equalizing.

FIG. 11 illustrates an embodiment of a radio receiver arrangement 2 in a WCDMA system of a chip-level equalization type. The digital radio signal 24 is provided to a filter 55 of the equalization core 40. The filter 55 has the effect of combining weighted and delayed part signals at a chip level. The filter 55 is configured for filtering the received digital signal into an equalized chip signal, minimizing a distortion by use of a least minimum mean square error approach. The weights are determined in an impairment matrix estimator 84, starting with the autocorrelation function between the part signals. The autocorrelation function is estimated using antenna chip samples. The combination weight estimator 70 filter is thus configured, in an autocorrelation impairment section 82, for calculating an autocorrelation impairment matrix $R_y$. The combination weight estimator 70 in this embodiment further computes, in a signal impairment section 83, a correction $R_y^{corr}$ to precompensate for the correlation in the UL scrambling codes into a signal impairment matrix. This correction makes use of knowledge of the channelization code to be used for the subsequent despreading. These corrections do also use information about the channel estimates and the β factors in analogy with the non-parametric GRake approach described above. The respective combining weight for each chip-level part signal is provided as a product of the channel estimations and an inverse of the corrected signal impairment matrix. The weights are then provided to be used in the filter 55.

The equalized digital chip-level signal 54 is provided to a despreader arrangement 56, despreading the equalized digital chip-level signal 54 into a symbol-level by a spreading code, giving the equalized digital radio signal 49. This is performed by the channelization code that was indicated to the signal impairment section 83.

Figure 12:
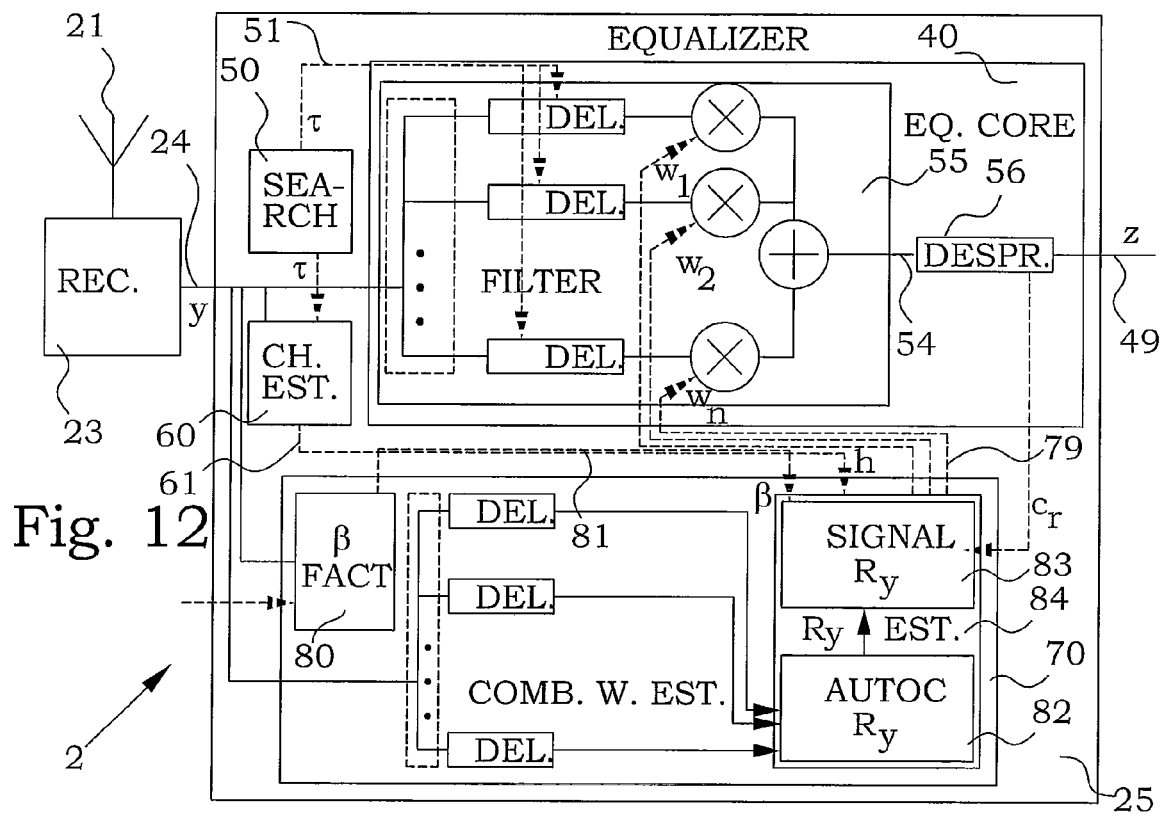

FIG. 12 illustrates another embodiment of a radio receiver arrangement 2 in a WCDMA system of a chip-level equalization type. In this embodiment, a channel searcher 50 is present, assisting in finding suitable channel delays. In the particular embodiment of FIG. 12, the results, i.e. the delay values τ 51, of the channel searcher 50 are provided to the filter 55 for making the filtering efficient. However, the autocorrelation is performed for all possible delays. This has the advantage of obtaining the best possible measure of the overall autocorrelation. In an alternative embodiment, the delay values τ 51 may be provided to both the filter 55 and the combination weight estimator 70.

Figure 13:
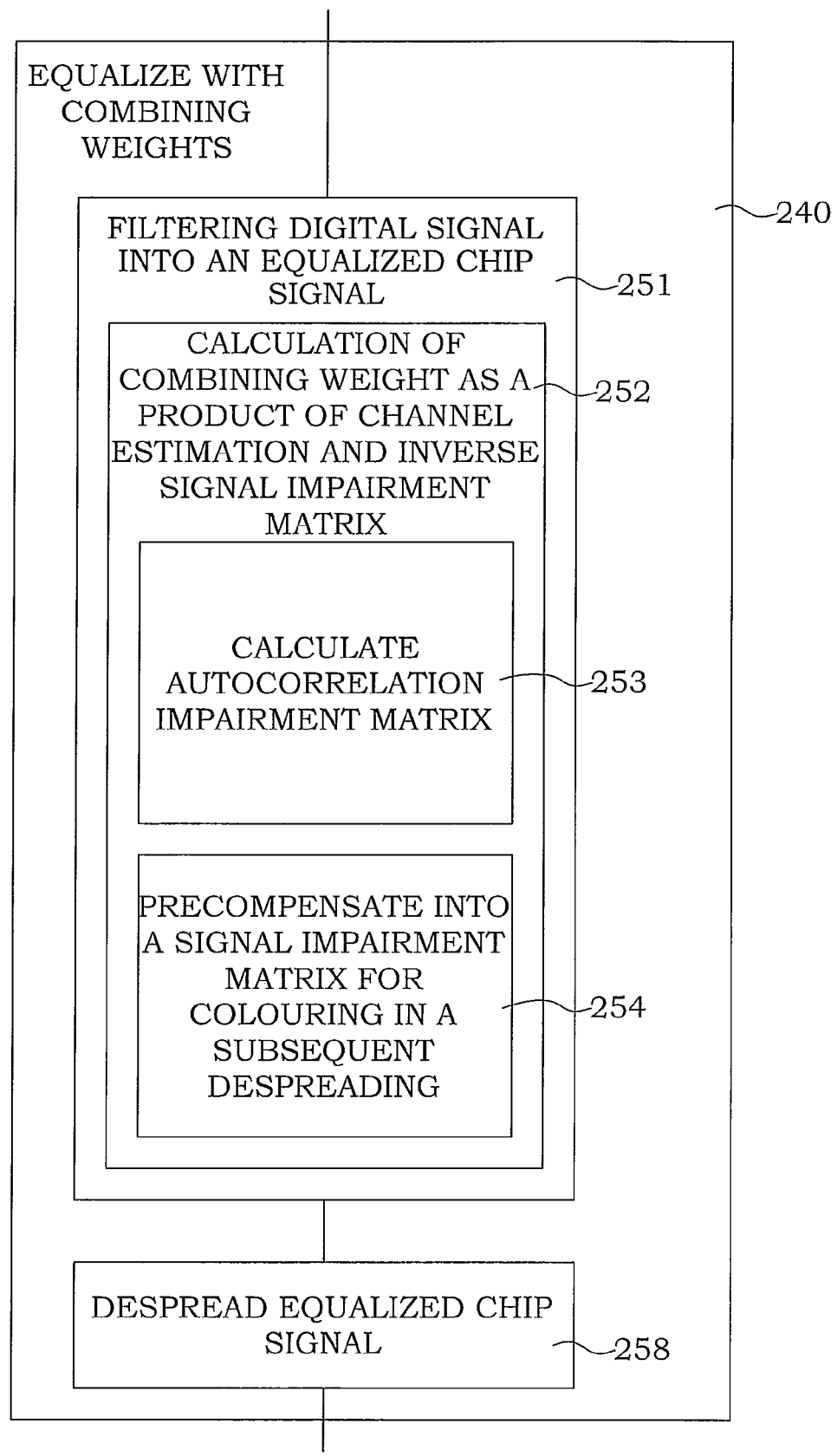
FIG. 13 is a flow diagram of steps of an embodiment of an equalizing step of an equalizing method using chip-level equalizing.

FIG. 13 illustrates an embodiment of the equalizing step 240 (of FIG. 4) for a chip-level equalizing method based LMMSE. In step 251, the received digital signal is filtered into an equalized chip signal, minimizing a distortion by use of a least minimum mean square error approach. The filtering comprises the step 252 of calculating the respective combining weight for each chip-level part signal as a product of the channel estimations and an inverse of the signal impairment matrix. In step 253, an autocorrelation impairment matrix is calculated using the autocorrelation of the chip-level signal. In step 254, the autocorrelation impairment matrix is precompensated into a signal impairment matrix by compensating a subsequently appearance of systematic colouring that will be caused by the scrambling codes in a subsequent despreading procedure. The precompensation depends on the spreading code that is going to be used in the subsequent step and the spreading codes of the available channels. In step 258, the equalized chip signal is despread to a symbol-level by a first spreading code, giving the equalized digital radio signal.

Figure 14:
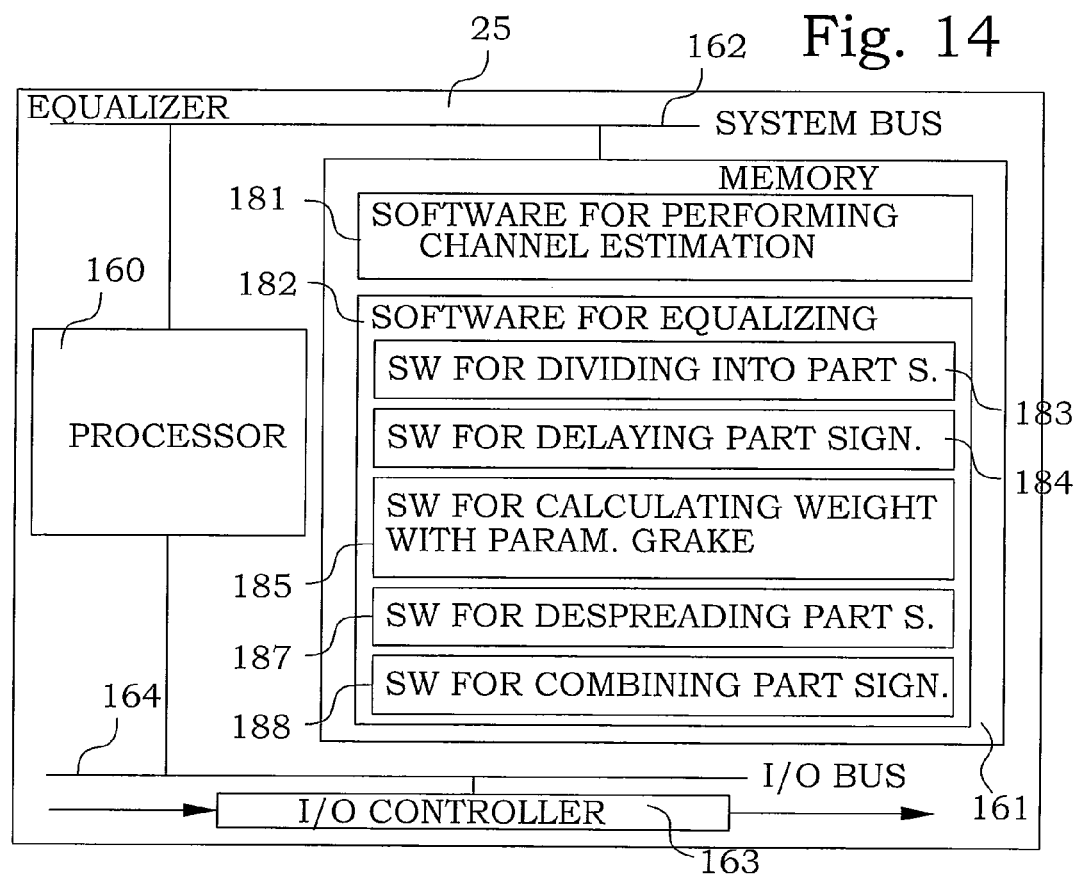
FIGS. 14-16 are block diagrams of embodiments of equalizers.

As an implementation example, FIG. 14 is a block diagram illustrating an example embodiment of an equalizer 25. This embodiment is based on a processor 160, for example a microprocessor, a memory 161, a system bus 162, an input/output (I/O) controller 163 and an I/O bus 164. In this embodiment the received digital radio signal is received by the I/O controller 163 are stored in the memory 161. The I/O controller 163 also controls the issue of the equalized digital radio signal. The processor 160 executes a software component 181 for performing a channel estimation on the received digital radio signal, and a software component 182 for equalizing the received digital radio signal. The software component 182 comprises a software part component 183 for dividing the received digital in part signals, a software part component 184 for delaying each part signal by a respective delay, a software part component 185 for calculating a respective combining weight by despreading each part signal with a spreading code of a control channel comprising a pilot signal, estimating a pilot impairment matrix and modifying the pilot impairment matrix into a signal impairment matrix, a software part component 187 for despreading each part signal into a symbol-level part signal, and a software part component 188 for combining the symbol-level part signals. This software is stored in the memory 161. The processor 160 communicates with the memory 161 over the system bus 162. Software component 181 may implement the functionality of block 60 in the embodiments of FIG. 3, 5 or 6. Software component 182 may implement the functionality of blocks 40 and 70 in the embodiments of FIG. 3, 5 or 6. Software part component 183 may implement the functionality of block 41 in the embodiments of FIG. 5 or 6. Software part component 184 may implement the functionality of blocks 42 in the embodiments of FIG. 5 or 6. Software part component 185 may implement the functionality of block 70 in the embodiments of FIG. 3, 5 or 6. Software part component 187 may implement the functionality of blocks 43 in the embodiments of FIG. 5 or 6. Software part component 188 may implement the functionality of block 45 in the embodiments of FIG. 5 or 6.

Figure 15:
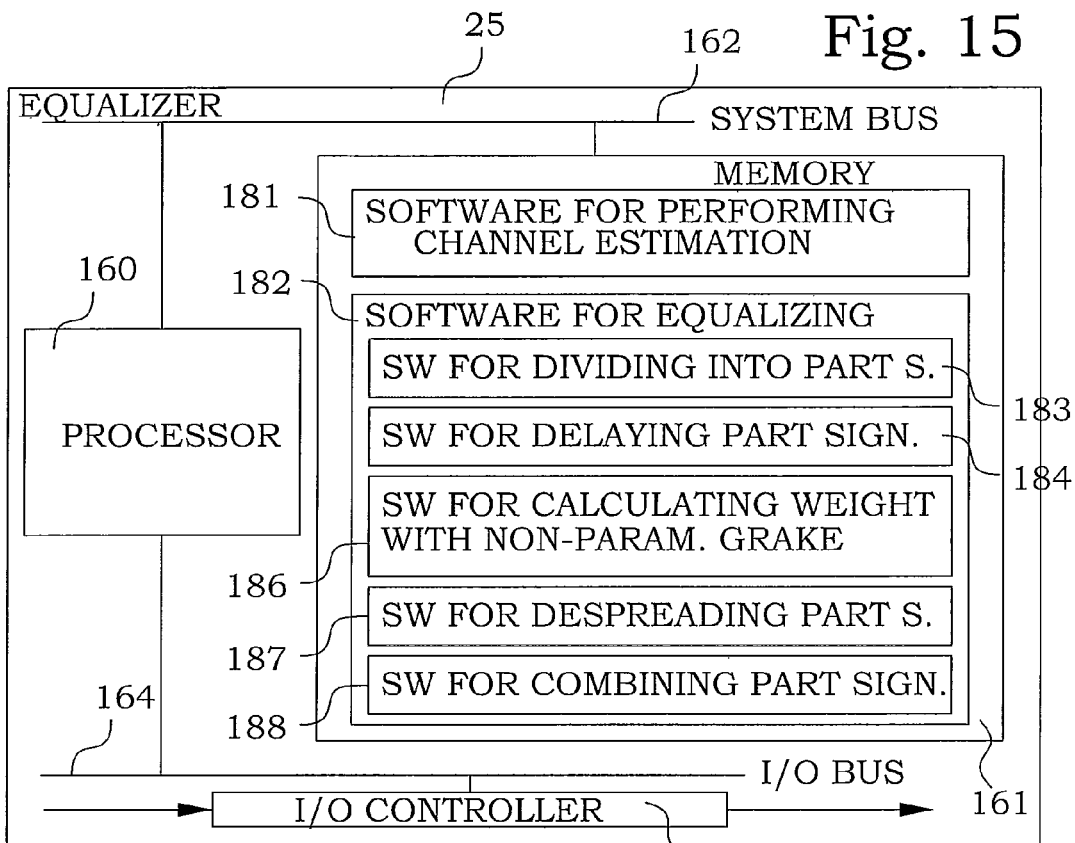

As an implementation example, FIG. 15 is a block diagram illustrating an example embodiment of an equalizer 25. This embodiment is based on a processor 160, for example a microprocessor, a memory 161, a system bus 162, an input/output (I/O) controller 163 and an I/O bus 164. In this embodiment the received digital radio signal is received by the I/O controller 163 are stored in the memory 161. The I/O controller 163 also controls the issue of the equalized digital radio signal. The processor 160 executes a software component 181 for performing a channel estimation on the received digital radio signal, and a software component 182 for equalizing the received digital radio signal. The software component 182 comprises a software part component 183 for dividing the received digital in part signals, a software part component 184 for delaying each part signal by a respective delay, a software part component 186 for calculating a respective combining weight by despreading each part signal with a spreading code of an unused channel, estimating a noise impairment matrix and modifying the noise impairment matrix into a signal impairment matrix, a software part component 187 for despreading each part signal into a symbol-level part signal, and a software part component 188 for combining the symbol-level part signals. This software is stored in the memory 161. The processor 160 communicates with the memory 161 over the system bus 162. Software component 181 may implement the functionality of block 60 in the embodiments of FIG. 3, 5 or 6. Software component 182 may implement the functionality of blocks 40 and 70 in the embodiments of FIG. 3, 5 or 6. Software part component 183 may implement the functionality of block 41 in the embodiments of FIG. 5 or 6. Software part component 184 may implement the functionality of blocks 42 in the embodiments of FIG. 5 or 6. Software part component 186 may implement the functionality of block 70 in the embodiments of FIG. 3, 5 or 6. Software part component 187 may implement the functionality of blocks 43 in the embodiments of FIG. 5 or 6. Software part component 188 may implement the functionality of block 45 in the embodiments of FIG. 5 or 6.

Figure 16:
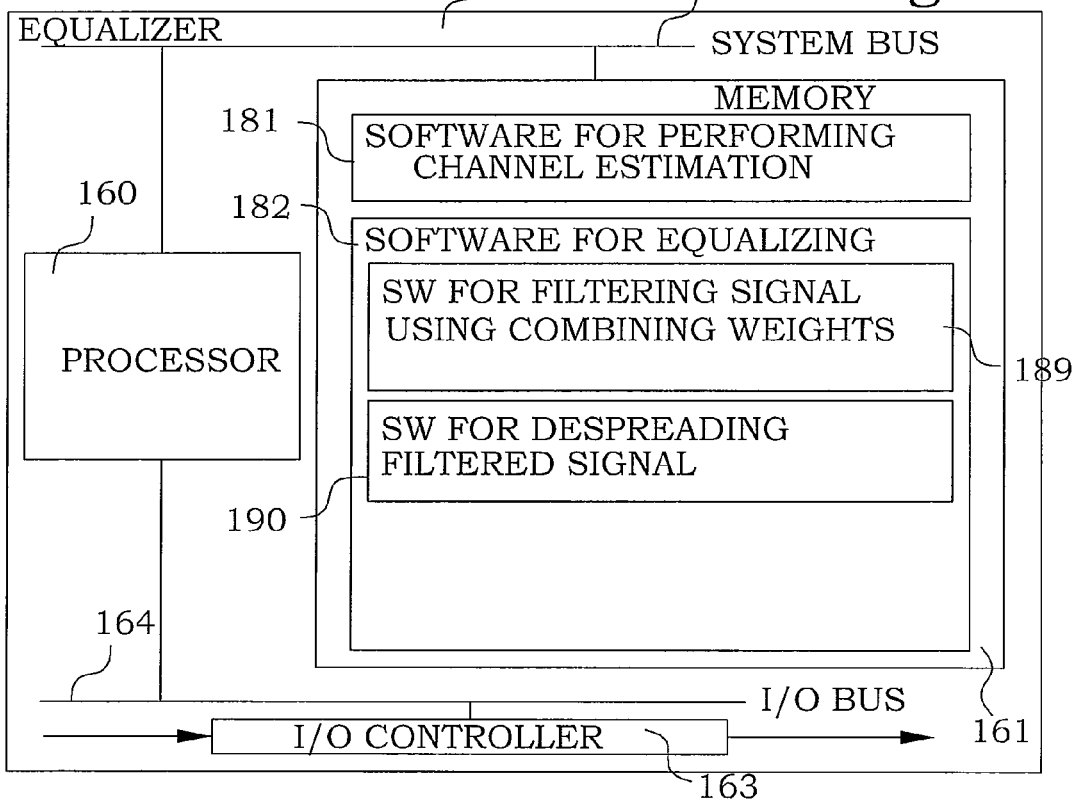

As an implementation example, FIG. 16 is a block diagram illustrating an example embodiment of an equalizer 25. This embodiment is based on a processor 160, for example a microprocessor, a memory 161, a system bus 162, an input/output (I/O) controller 163 and an I/O bus 164. In this embodiment the received digital radio signal is received by the I/O controller 163 are stored in the memory 161. The I/O controller 163 also controls the issue of the equalized digital radio signal. The processor 160 executes a software component 181 for performing a channel estimation on the received digital radio signal, and a software component 182 for equalizing the received digital radio signal. The software component 182 comprises a software part component 189 for filtering the received digital signal into an equalized chip signal by calculating a respective combining weight, a software part component 190 for despreading the equalized chip signal to a symbol level. This software is stored in the memory 161. The processor 160 communicates with the memory 161 over the system bus 162. Software component 181 may implement the functionality of block 60 in the embodiments of FIG. 3, 9 or 10. Software component 182 may implement the functionality of blocks 40 and 70 in the embodiments of FIG. 3, 9 or 10. Software part component 189 may implement the functionality of blocks 55 and 70 in the embodiments of FIG. 9 or 10. Software part component 190 may implement the functionality of block 56 in the embodiments of FIG. 9 or 10.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

Appendix A

GRake
Signal Model
A model of a UE transmitted signal s(t) is given below.

$$s(t) = \sum_{m=-\infty}^{\infty} \left( \sum_{n=1}^{Ncodes} \beta_n c_n(m) C(m) s_n \left( \left\lfloor \frac{m}{SF_n} \right\rfloor \right) \right) \delta(t-mT) \quad (A1)$$

Here $\beta_n$ is the amplitude for each physical channel code (DPCCH $\beta_c$, E-DPCCH $\beta_{ec}$ and E-DPDCH $\beta_{ed,SF2}$, $\beta_{ed,SF4}$ are considered here), $c_n$ is the real-valued channelization code, C is the complex-valued scrambling code, in the following normalized to energy 1. $s_n$ is the transmitted signal, which may be either real-valued or complex-valued, but here it will be assumed to be of norm 1. If both I and Q components are transmitted, the $\beta_n$ is scaled accordingly. SF is the spreading factor. Typically for 2 ms Transmission Time Interval (TTI) in Enhanced UpLink (EUL), $\beta_n \in \{\beta_c, \beta_{ec}, \beta_{ed,SF2}, \beta_{ed,SF4}\}$ and $SF_n \in \{2,4,256\}$. T is the chip interval 1/3.84 μs. The combinations of used spreading factors on E-DPDCH are 1SF4, 2SF4, SF2 and 2SF2+2SF4.

The received signal on antenna #a $y^a(t)$ has the following general form:

$$y^a(t) = \int_{-\infty}^{\infty} h^a * (\tau) s(t-\tau) d\tau + e^a(t) \quad (A2)$$

$$= \sum_{m=-\infty}^{\infty} h^a(t-mT) \left( \sum_{n=1}^{Ncodes} \beta_n c_n(m) C(m) s_n \left( \left\lfloor \frac{m}{SF_n} \right\rfloor \right) \right) + e^a(t)$$

where h(t) is a channel and e(t) is noise. In this formulation the impact of the RRC filtering at transmit and receive side is part of the channel h(t) and also impact the statistics of the noise term e(t)

Parametric GRake equations

In the following, we will derive the statistics of the despread physical channels assuming only that DPCCH and one E-DPDCH channel is transmitted. However the results will be valid and possible to generalize to all codes. After despreading DPCCH at finger delay f to obtain the signal $s_c$(0) we get:

$$r_c^a(f) = \sum_{n=0}^{SF_c-1} y^a(nT+f) c_c(n) C*(n) \quad (A3)$$

$$= \sum_{n=0}^{SF_c-1} \sum_{m=-\infty}^{\infty} h^a(nT+f-mT)$$

$$\beta_c c_c(m) C(m) s_c \left( \left\lfloor \frac{m}{SF_c} \right\rfloor \right) c_c(n) C*$$

$$(n) + \sum_{n=0}^{SF_c-1} \sum_{m=-\infty}^{\infty} h^a(nT+f-mT)$$

$$\beta_{ed} c_{ed}(m) C(m) s_{ed} \left( \left\lfloor \frac{m}{SF_{ed}} \right\rfloor \right) c_c(n) C*$$

-continued $$\ldots(n) + \sum_{n=0}^{SF_c-1} e^a(nT+f)c_c(n)C^*(n)$$

This can be written:

$$r_c^a(f) = SF_c \beta_c h_{a,f} s_c(0) + \beta_c z_{c,c}^a(f) + \beta_{ed} z_{c,ed}^a(f) + v_c^a(f), \quad (A4)$$

with:

$$z_{c,c}^a(f) = \sum_{n=0}^{SF_c-1} \sum_{\substack{m=-\infty \\ m \neq n}}^{\infty} h^a(nT+f-mT)c_c(m)C(m)s_c\left(\left\lfloor \frac{m}{SF_c} \right\rfloor\right)c_c(n)C^*(n) \quad (A5)$$

$$z_{c,ed}^a(f) = \quad (A6)$$

$$\sum_{n=0}^{SF_c-1} \sum_{\substack{m=-\infty \\ m \neq n}}^{\infty} h^a(nT+f-mT)c_{ed}(m)C(m)s_{ed}\left(\left\lfloor \frac{m}{SF_{ed}} \right\rfloor\right)c_c(n)C^*(n)$$

$$v_c^a(f) = \sum_{n=0}^{SF_c-1} e^a(nT+f)c_c(n)C^*(n) \quad (A7)$$

The first term is the desired signal. The condition m≠n in the second term is due to the desired term which has been broken out, while this condition on the third term is due to that the codes are orthogonal at zero shift when summed over N chips.

An optimal estimator $\hat{s}_c(0)$ of the desired signal would take the form:

$$\hat{s}_c(0) = SF_c \beta_c h^* R_u^{-1} r_c, \quad (A8)$$

where the equation (A4) is vectorized. Here $R_u$ is the covariance matrix of the impairment terms in (A4).

Scrambling Code Properties

The UL long scrambling code used in WCDMA is not completely random. The second and fourth order moments of a random code would be characterized by (c.f. (1a-d)):

$$E(C(m_1)C^*(n_2)) = \delta(m_1 - n_2)$$

$$E(C(m_1)C(n_2)) = 0$$

$$E(C(m_1)C^*(n_2)C(m_2)C^*(n_1)) = 1, m_1 = n_2, m_2 = n_1$$

$$E(C(m_1)C^*(n_2)C(n_2)C^*(n_1)) = 0, \text{otherwise} \quad (A9a\text{-}d)$$

where E denotes the expectation value This is true for most scrambling codes used in cellular standards.

Prior Art Parametric GRake Equations

The parametric GRake method of today relies on the properties (A9a-d) of the scrambling code when estimating $R_u$. The covariance $E(z_{x1,y1}^a(f_1) z_{x2,y2}^{*b}(f_2))$ where x1,y1,x2, y2∈{c,ed}, is now computed, i.e. the covariance of the first two impairment terms in (A4). An average over the codes and the symbols is taken, assuming random symbols and noise.

The covariance of expression (A5), i.e. the self interference covariance, becomes as shown in expression (A10) below.

The covariance of expression (A6), i.e. the inter-code interference covariance, becomes as shown in expression (A11) below.

By introducing the notation:

$$R_{ran}(f_1, f_2) = \sum_{\substack{m=-\infty \\ m \neq n}}^{\infty} h^a(f_1 + mT) h^{b*}(f_2 + mT) \quad (A12)$$

both covariances becomes:

$$r_{c,c}^{a,b}(f_1, f_2) = r_{c,ed}^{a,b}(f_1, f_2) = SF_c R_{ran}(f_1, f_2) \quad (A13)$$

and this is generally applicable for all channels.

A covariance $R_c$ for a despread DPCCH signal can be expressed as:

$$R_c(f_1, f_2) = E((r_c^a(f_1) - E(r_c^a(f_1)))(r_c^{b*}(f_2) - E(r_c^{b*}(f_2)))) \quad (A14)$$

which results in:

$$R_c(f_1, f_2) = SF_c(\beta_c^2 + \beta_{ec}^2 + \beta_{ed,sf2}^2 + \beta_{ed,sf4}^2) R_{ran}(f_1, f_2) + SF_c N_0 R_n(f_2 - f_1) \quad (A15)$$

where $N_0$ is the noise spectral density and $R_n$ represents the covariance between noise of different fingers.

$$r_{c,c}^{a,b}(f_1, f_2) = E(z_{c,c}^a z_{c,c}^{b*}) = \quad (A10)$$

$$= E\left(\sum_{n1=0}^{SF_c-1} \sum_{\substack{m1=-\infty \\ m1 \neq n1}}^{\infty} \sum_{n2=0}^{SF_c-1} \sum_{\substack{m2=-\infty \\ m2 \neq n2}}^{\infty} h^a(n_1 T + f_1 - m_1 T) c_c(m_1) C\right.$$

$$(m_1) s_c\left(\left\lfloor \frac{m_1}{SF_c} \right\rfloor\right) c_c(n_1) C^*(n_1) h^{b*}(n_2 T + f_2 - m_2 T) c_c(m_2)$$

$$\left. C^*(m_2) s_c^*\left(\left\lfloor \frac{m_2}{SF_c} \right\rfloor\right) c_c(n_2) C(n_2) \right) =$$

$$= \sum_{n1=0}^{SF_c-1} \sum_{\substack{m1=-\infty \\ m1 \neq n1}}^{\infty} \sum_{n2=0}^{SF_c-1} \sum_{\substack{m2=-\infty \\ m2 \neq n2}}^{\infty} h^a(n_1 T + f_1 - m_1 T) h^{b*}$$

$$(n_2 T + f_2 - m_2 T) \delta(m_1 - m_2) \delta(n_1 - n_2) s_c\left(\left\lfloor \frac{m_1}{SF_c} \right\rfloor\right) s_c^*$$

$$\left(\left\lfloor \frac{m_2}{SF_c} \right\rfloor\right) =$$

$$= SF_c \sum_{\substack{m=-\infty \\ m \neq n}}^{\infty} h^a(f_1 + mT) h^{b*}(f_2 + mT)$$

$$r_{c,ed}^{a,b}(f_1, f_2) = E(z_{c,ed}^a z_{c,ed}^{b*}) = \quad (A11)$$

$$= E\left(\sum_{n1=0}^{SF_c-1} \sum_{\substack{m1=-\infty \\ m1 \neq n1}}^{\infty} \sum_{n2=0}^{SF_c-1} \sum_{\substack{m2=-\infty \\ m2 \neq n2}}^{\infty} h^a(n_1 T + f_1 - m_1 T) c_{ed}(m_1)\right.$$

$$C(m_1) s_{ed}\left(\left\lfloor \frac{m_1}{SF_{ed}} \right\rfloor\right) c_c(n_1) C^*(n_1) h^{b*}(n_2 T + f_2 - m_2 T)$$

$$\left. c_{ed}(m_2) C^*(m_2) s_{ed}^*\left(\left\lfloor \frac{m_2}{SF_{ed}} \right\rfloor\right) c_c(n_2) C(n_2) \right) =$$

$$= \sum_{n1=0}^{SF_c-1} \sum_{\substack{m1=-\infty \\ m1 \neq n1}}^{\infty} \sum_{n2=0}^{SF_c-1} \sum_{\substack{m2=-\infty \\ m2 \neq n2}}^{\infty} h^a(n_1 T + f_1 - m_1 T) h^{b*}$$

$$(n_2 T + f_2 - m_2 T) \delta(m_1 - m_2) \delta(n_1 - n_2) s_{ed}$$

$$\left(\left\lfloor \frac{m_1}{SF_{ed}} \right\rfloor\right) s_{ed}^*\left(\left\lfloor \frac{m_2}{SF_{ed}} \right\rfloor\right) =$$

$$= SF_c \sum_{\substack{m=-\infty \\ m \neq 0}}^{\infty} h^a(f_1 + mT) h^{b*}(f_2 + mT)$$

Scrambling Code Systematic Colouring Properties

As discussed further above (10a-b), the UL scrambling codes have the further properties of:

$$C(2m)^2 C(2m+1)^{2*} = -4$$

$$C(2m+1)^2 C(2m)^{2*} = -4 \quad \text{(A16a-b)}$$

These properties will change the parametric GRake equations to be used.

Modified Parametric GRake Equations

According to the modified GRake equations, the covariance $E(z_{x1,y1}^a(f_1)z^{*b}_{x2,y2}(f_2))$ where $x1,y1,x2,y2 \in \{c,ed\}$, i.e. the covariance of the first two impairment terms in (A4) is computed, also using the newly discovered scrambling code properties (A14a-b).

The covariance of expression (A5) then becomes as shown in expression (A17) below.

The product of the four channelization codes sum that appear in the middle step becomes:

$$\sum_{n=0}^{SF_c/2-1} c_{ed}(2n)c_c(2n)c_{ed}(2n+1)c_c(2n+1)s_{ed}\left(\left\lfloor\frac{2n}{SF_{ed}}\right\rfloor\right)s_c^*\left(\left\lfloor\frac{2n+1}{SF_{ed}}\right\rfloor\right) = \quad \text{(A18)}$$

$$SF_c/2$$

The covariance of expression (A6) then similarly becomes as shown in expression (A19) below.

$$r_{c,c}^{a,b}(f_1, f_2) = E(z_{c,c}^a z_{c,c}^{b*}) \quad \text{(A17)}$$

$$= E\left(\sum_{n1=0}^{SF_c-1}\sum_{\substack{m1=-\infty\\m1\neq n1}}^{\infty}\sum_{n2=0}^{SF_c-1}\sum_{\substack{m2=-\infty\\m2\neq n2}}^{\infty} h^a(n_1T+f_1-m_1T)c_c(m_1)\right.$$

$$C(m_1)s_c\left(\left\lfloor\frac{m_1}{SF_c}\right\rfloor\right)c_c(n_1)C^*(n_1)h^{b*}(n_2T+f_2-m_2T)c_c$$

$$\left.(m_2)C^*(m_2)s_c^*\left(\left\lfloor\frac{m_2}{SF_c}\right\rfloor\right)c_c(n_2)C(n_2)\right) =$$

$$= \sum_{n1=0}^{SF_c-1}\sum_{\substack{m1=-\infty\\m1\neq n1}}^{\infty}\sum_{n2=0}^{SF_c-1}\sum_{\substack{m2=-\infty\\m2\neq n2}}^{\infty} h^a(n_1T+f_1-m_1T)h^{b*}$$

$$(n_2T+f_2-m_2T)\delta(m_1-m_2)\delta(n_1-n_2)s_c\left(\left\lfloor\frac{m_1}{SF_c}\right\rfloor\right)s_c^*$$

$$\left(\left\lfloor\frac{m_2}{SF_c}\right\rfloor\right) + -h^a(f_1+T)h^{b*}(f_2-T)\sum_{n=0}^{SF_{c/2}-1}c_c(2n)c_c(2n)$$

$$c_c(2n+1)c_c(2n+1)s_c\left(\left\lfloor\frac{2n}{SF_c}\right\rfloor\right)s_c^*\left(\left\lfloor\frac{2n+1}{SF_c}\right\rfloor\right) + -h^a$$

$$(f_1-T)h^{b*}(f_2+T)\sum_{n=0}^{SF_{c/2}-1}c_c(2n+1)c_c(2n+1)$$

$$c_c(2n)c_c(2n)s_c\left(\left\lfloor\frac{2n+1}{SF_c}\right\rfloor\right)s_c^*\left(\left\lfloor\frac{2n}{SF_c}\right\rfloor\right) =$$

$$= SF_c\sum_{\substack{m=-\infty\\m\neq 0}}^{\infty} h^a(f_1+mT)h^{b*}(f_2+mT) - h^a(f_1+T)h^{b*}$$

$$(f_2-T)SF_c/2 - h^a(f_1-T)h^{b*}(f_1-T)h^{b*}(f_2+T)$$

$$SF_c/2$$

$$r_{c,ed}^{a,b}(f_1, f_2) = E(z_{c,ed}^a z_{c,ed}^{b*}) = \quad \text{(A19)}$$

$$= E\left(\sum_{n1=0}^{SF_c-1}\sum_{\substack{m1=-\infty\\m1\neq n1}}^{\infty}\sum_{n2=0}^{SF_c-1}\sum_{\substack{m2=-\infty\\m2\neq n2}}^{\infty} h^a(n_1T+f_1-m_1T)c_{ed}(m_1)\right.$$

$$C(m_1)s_{ed}\left(\left\lfloor\frac{m_1}{SF_{ed}}\right\rfloor\right)c_c(n_1)C^*(n_1)h^{b*}(n_2T+f_2-m_2T)$$

$$\left.c_{ed}(m_2)C^*(m_2)s_{ed}^*\left(\left\lfloor\frac{m_2}{SF_{ed}}\right\rfloor\right)c_c(n_2)C(n_2)\right) =$$

$$= \sum_{n1=0}^{SF_c-1}\sum_{\substack{m1=-\infty\\m1\neq n1}}^{\infty}\sum_{n2=0}^{SF_c-1}\sum_{\substack{m2=-\infty\\m2\neq n2}}^{\infty} h^a(n_1T+f_1-m_1T)h^{b*}$$

$$(n_2T+f_2-m_2T)\delta(m_1-m_2)\delta(n_1-n_2)s_{ed}\left(\left\lfloor\frac{m_1}{SF_{ed}}\right\rfloor\right)s_{ed}^*$$

$$\left(\left\lfloor\frac{m_2}{SF_{ed}}\right\rfloor\right) + -h^a(f_1+T)h^{b*}(f_2-T)\sum_{n=0}^{SF_{c/2}-1}c_{ed}(2n)c_c$$

$$(2n)c_{ed}(2n+1)c_c(2n+1)s_{ed}\left(\left\lfloor\frac{2n}{SF_{ed}}\right\rfloor\right)s_{ed}^*\left(\left\lfloor\frac{2n+1}{SF_{ed}}\right\rfloor\right) +$$

$$-h^a(f_1-T)h^{b*}(f_2-T)\sum_{n=0}^{SF_{c/2}-1}c_{ed}(2n+1)c_c(2n+1)$$

$$c_{ed}(2n)c_c(2n)s_{ed}\left(\left\lfloor\frac{2n+1}{SF_{ed}}\right\rfloor\right)s_{ed}^*\left(\left\lfloor\frac{2n}{SF_{ed}}\right\rfloor\right) =$$

$$= SF_c\sum_{\substack{m=-\infty\\m\neq 0}}^{\infty} h^a(f_1+mT)h^{b*}(f_2+mT) - h^a(f_1+T)h^{b*}$$

$$(f_2-T)SF_c/2 - h^a(f_1-T)h^{b*}(f_2+T)SF_c/2$$

The two terms containing a "sum of product of 4 channelization codes" that appear in the middle step can be evaluated using the fact that the signal term $s_{ed}$ is constant over intervals $n=k*SF_c, \ldots, k*SF_c-2$, for $k=0, \ldots, SF_c/SF_{ed}-1$ intervals. Furthermore for SF2 $c(n)=[1\; -1\; 1\; -1, \ldots]$ and for SF4 $c(n)=[1\; 1\; -1\; -1\; 1\; 1\; -1\; -1 \ldots]$. The channelization code sum over these intervals of constant $S_{ed}$ then becomes:

$$\sum_{n=0}^{SF_{c/2}-1} c_c(2n)c_c(2n)c_c(2n+1)c_c(2n+1)s_c\left(\left\lfloor\frac{2n}{SF_c}\right\rfloor\right)s_c^*\left(\left\lfloor\frac{2n+1}{SF_c}\right\rfloor\right) = \quad \text{(A20)}$$

$$SF_c/2$$

If $SF_{ed}=2$, then the expression becomes:

$$\sum_{n=0}^{SF_{c/2}-1} c_{ed}(2n)c_c(2n)c_{ed}(2n+1) \quad \text{(A21)}$$

$$c_c(2n+1)s_{ed}\left(\left\lfloor\frac{2n}{SF_{ed}}\right\rfloor\right)s_{ed}^*\left(\left\lfloor\frac{2n+1}{SF_{ed}}\right\rfloor\right) = -SF_c/2$$

The second channelizaton code sum in (A17) can be verified to be identical to the first given by (A18) or (A19).

The cross terms $E(z_{x1,y1}^a(f_1)z_{x2,y2}^{b*}(f_2))$ have zero expected value if $x_1 \neq x_2$, $y_1 \neq y_2$.

Let us introduce the notation:

$$R_{ul}(f_1,f_2) = h^a(f_1+T)h^{b*}(f_2-T) + h^a(f_1-T)h^{b*}(f_2+T) \quad \text{(A22)}$$

Note that the new covariance modification $R_{ul}$ shows that there exists a strong correlation between despread data one chip before and one chip after a strong energy finger.

The covariance $R_c$ for a despread DPCCH signal (A14) can be expressed as:

$$R_c(f_1, f_2) = \quad \text{(A23)}$$

$$SF_c(\beta_c^2 + \beta_{ec}^2 + \beta_{ed,sf2}^2 + \beta_{ed,sf4}^2)R_{ran}(f_1, f_2) + SF_cN_0R_n(f_2-f_1) \pm$$

$$SF_c(0.5\beta_c^2 + 0.5\beta_{ec}^2 - 0.5\beta_{ed,sf2}^2 + 0.5\beta_{ed,sf4}^2)R_{ul}(f_1, f_2)$$

If 2SF2+2SF4 is used in combination in the DPCCH channel then, since $\beta_{ed,sf2}^2 = 2\beta_{ed,sf4}^2$, this simplifies to:

$$R_c(f_1, f_2) = SF_c(\beta_c^2 + \beta_{ec}^2 + 3/2\beta_{ed,sf2}^2)R_{ran}(f_1, f_2) + \quad (A24)$$
$$SF_cN_0R_n(f_2 - f_1) - SF_c(0.5\beta_c^2 + 0.5\beta_{ec}^2 - 0.25\beta_{ed,sf2}^2)R_{ul}(f_1, f_2)$$

If only SF4 is used, the expression becomes:

$$R_c(f_1, f_2) = SF_c(\beta_c^2 + \beta_{ec}^2 + \beta_{ed,sf4}^2)R_{ran}(f_1, f_2) + \quad (A25)$$
$$SF_cN_0R_n(f_2 - f_1) - SF_c(0.5\beta_c^2 + 0.5\beta_{ec}^2 + 0.5\beta_{ed,sf2}^2)R_{ul}(f_1, f_2)$$

Finally if only 2×SF2 is used, then:

$$R_c(f_1, f_2) = SF_c(\beta_c^2 + \beta_{ec}^2 + \beta_{ed,sf4}^2)R_{ran}(f_1, f_2) + \quad (A26)$$
$$SF_cN_0R_n(f_2 - f_1) - SF_c(0.5\beta_c^2 + 0.5\beta_{ec}^2 - 0.5\beta_{ed,sf2}^2)R_{ul}(f_1, f_2)$$

Comparing these expressions to the parametric GRake equations we note one complication. With only the first term present as in today's implementation we can write:

$$R_{isi} = SF_c \sum_{\substack{m=-\infty \\ m \neq 0}}^{\infty} h^a(f + mT)h^{b*}(f + mT) \quad (A27)$$

$$R_e = SF_cR_n$$

$$R_c = E_TR_{isi} + N_0R_e$$

and then solve for the total energy $E_T$ and noise power $N_0$ using a sample estimate of $R_c$ in the left-hand-side. $R_e$ is a scaled version of the covariance between noise of different fingers.

For the case of only SF4 in the DPCCH channel we can re-use the GRake equations with modification:

$$R_{isi,SF4} = SF_c(R_{ran} - 0.5R_{ul})$$

$$R_e = SF_cR_n$$

$$R_{c,SF4} = E_TR_{isi,SF4} + N_0R_e \quad (A28)$$

However when SF2 is involved such simplifications are not possible since the scalar energy factors, i.e. the beta factors before $R_{ran}$ and $R_{ul}$ are not identical. Rewriting (A24) and (A26) in the form (A27) would require a new factor in front of $R_{ul}$, this factor being a function of beta factors. However, when SF2 is used, the majority of the power lies in the E-DPDCH, so that we can make the approximation for the case 2×SF2:

$$R_{isi,2SF2} = SF_c(R_{ran} + 0.5R_{ul})$$

$$R_e = SF_cR_n$$

$$R_{c,2SF2} = E_TR_{isi,2SF2} + N_0R_e \quad (A29)$$

And for 2×SF2+2×SF4:

$$R_{isi,2SF2+2SF4} = SF_c(R_{ran} + 1/6R_{ul})$$

$$R_e = SF_cR_n$$

$$R_{c,2SF2+2SF4} = E_TR_{isi,SF2+SF4} + N_0R_e \quad (A30)$$

Modified GRake Weight Calculation for Data Channels

To compute the impairment matrix (and the associated weights) applicable to the E-DPDCH channel, the order in the previous section is basically reversed and the E-DPDCH is let to take the role of DPCCH. Once the impairment matrix has been determined a modified version of (A8) can be used to determine data signal estimates. It is assumed that $E_T$ and $N_0$ has been estimated using the results of any of (A28)-(A30), whichever is applicable. First look at despreading of an E-DPDCH channel using SF4. The general case becomes:

$$R_{SF4}(f_1, f_2) = \quad (A31)$$
$$SF_4(\beta_c^2 + \beta_{ec}^2 + \beta_{ed,sf2}^2 + \beta_{ed,sf4}^2)R_{ran}(f_1, f_2) + SF_4N_0R_n(f_2 - f_1) +$$
$$-SF_4(0.5\beta_c^2 + 0.5\beta_{ec}^2 - 0.5\beta_{ed,sf2}^2 + 0.5\beta_{ed,sf4}^2)R_{ul}(f_1, f_2)$$

If 2SF2+2SF4 is used in combination then, since $\beta_{ed,sf2}^2 = 2\beta_{ed,sf4}^2$, this simplifies to:

$$R_{SF4,2SF2+2SF4}(f_1, f_2) = \quad (A32)$$
$$SF_4(\beta_c^2 + \beta_{ec}^2 + 3/2\beta_{ed,sf2}^2)R_{ran}(f_1, f_2) + SF_4N_0R_n(f_2 - f_1) +$$
$$-SF_4(0.5\beta_c^2 + 0.5\beta_{ec}^2 - 0.25\beta_{ed,sf2}^2)R_{ul}(f_1, f_2) \approx$$
$$SF_4/SF_cR_{c,2SF2+2SF4}$$

where the last matrix is taken from (A30). If only SF4 is used, the expression becomes:

$$R_{SF4,SF4}(f_1, f_2) = SF_4(\beta_c^2 + \beta_{ec}^2 + \beta_{ed,sf4}^2)R_{ran}(f_1, f_2) + \quad (A33)$$
$$SF_4N_0R_n(f_2 - f_1) +$$
$$-SF_4(0.5\beta_c^2 + 0.5\beta_{ec}^2 + 0.5\beta_{ed,sf4}^2)R_{ul}(f_1, f_2)$$
$$= SF_4/SF_cR_{c,SF4}$$

where the last matrix is taken from (A28). Note that the impairment matrix is obtained as a scaled variant of the impairment matrix seen from the DPCCH despreading.

Next despreading SF2 is considered.

$$R_{SF2}(f_1, f_2) = \quad (A34)$$
$$SF_2(\beta_c^2 + \beta_{ec}^2 + \beta_{ed,sf2}^2 + \beta_{ed,sf4}^2)R_{ran}(f_1, f_2) + SF_2N_0R_n(f_2 - f_1) +$$
$$-SF_2(0.5\beta_{ed,sf2}^2 + 0.5\beta_c^2 + 0.5\beta_{ec}^2 - 0.5\beta_{ed,sf4}^2)R_{ul}(f_1, f_2)$$

Note the sign changes of $\beta_{ed,sf2}^2$ and $\beta_{ed,sf4}^2$ compared to DPCCH despreading. If 2SF2+2SF4 is used in combination then, since $\beta_{ed,sf2}^2 = 2\beta_{ed,sf4}^2$, this simplifies to:

$$R_{SF2,SF2+SF4}(f_1, f_2) = \quad (A35)$$
$$SF_2(\beta_c^2 + \beta_{ec}^2 + 3/2\beta_{ed,sf2}^2)R_{ran}(f_1, f_2) + SF_2N_0R_n(f_2 - f_1) +$$
$$-SF_2(0.25\beta_{ed,sf2}^2 + 0.5\beta_c^2 + 0.5\beta_{ec}^2)R_{ul}(f_1, f_2) \approx$$
$$SF_2 * E_TR_{ran}(f_1, f_2) + SF_2N_0R_n(f_2 - f_1) - SF_2E_T/6R_{ul}(f_1, f_2)$$

If only 2×SF2 is used, then:

$$R_{SF2,2SF2}(f_1, f_2) = \quad (A36)$$

$$SF_2(\beta_c^2 + \beta_{ec}^2 + \beta_{ed,sf2}^2)R_{ran}(f_1, f_2) + SF_2 N_0 R_n(f_2 - f_1) +$$

$$-SF_2(0.5\beta_c^2 + 0.5\beta_{ec}^2 + 0.5\beta_{ed,sf2}^2)R_{ul}(f_1, f_2) \approx$$

$$SF_2 * E_T R_{ran}(f_1, f_2) + SF_2 N_0 R_n(f_2 - f_1) - SF_2 E_T / 2 R_{ul}(f_1, f_2)$$

While despreading SF4 could rely directly on the impairment matrix calculated for the DPCCH, despreading SF2 apparently required some recalculations. The approach is to use the estimated total energy and noise power from (A29) or (A30) and plug that into equations (A35) and (A36).

Appendix B

GRake with Use of Unused Channelization Codes

Signal Model

Let $c_t$ be the Orthogonal Variable Spreading Factor (OVSF) code used on the sent data and $c_r$ the OVSF code used in the receiver. The OVSF code sequences re extended to be periodic. Let $$s\left(\left\lfloor \frac{m}{SF_{c_t}} \right\rfloor\right)$$

denote sent data, at each chip. This symbol is thus constant during a complete sent OVSF sequence. The sent scrambled data with a particular OVSF code $c_t$ can be written:

$$x(m) = c_t(m)C(m)s\left(\left\lfloor \frac{m}{SF_{c_t}} \right\rfloor\right).$$

(B1)

The data is sent over an air channel with delay taps $\{h_f\}$.

Descrambling with the same scrambling code and despreading the received signal with OVSF code c yields an observation at each finger location f:

$$r_{c_r}(f) = h(f)\frac{1}{SF_{cr}} \sum_{i=0}^{SF_{cr}-1} C^*(i)c_r(m)x(i+f) + e(f) \quad (B2)$$

$$= h(f)s_0 \delta_{c_t,c_r} + e(f).$$

Where $\delta_{c_t,c_r}$ if the codes $c_t$ and $c_r$ are the same and 0 otherwise, and $s_0$ is the data symbol to detect in case of matching channelization codes.

An optimal estimator $\hat{s}_c(0)$ of the desired signal would take the form:

$$\hat{s}_c(0) = SF_{c_r}\beta_{c_r} h^* R_u^{-1} r_{c_r}, \quad (B3)$$

Here $R_u$ is the covariance matrix of the impairment term in (B2).

Without loss of generality it is assumed that the scrambling sequence C(m) starts at 0. In practice it will start at an even offset. The impairment can be written:

$$e(f_1) = \frac{1}{SF_{c_r}} \sum_{k} h(k)(1 - \delta_{c_t,c_r}\delta_{k,f_1}) \left(\sum_{i=0}^{SF_{c_r}-1} C^*(i)c_r(i)x(i+f_1-k)\right) \quad (B4)$$

To compute the product the following index is used on the other term:

$$e(f_2) = \frac{1}{SF_{c_r}} \sum_{l} h(l)(1 - \delta_{c_t,c_r}\delta_{k,f_2}) \left(\sum_{j=0}^{SF_{c_r}-1} C^*(j)c_r(j)x(j+f_2-l)\right) \quad (B5)$$

If the same channelization code and the scrambling codes match, then there is energy used to detect the symbol. Thus the product becomes:

$$e(f_1)e^*(f_2) = \quad (B6)$$

$$\frac{1}{SF_{c_r}^2} \sum_{\substack{k,l \\ i,j}} h(k)h^*(l)C^*(i)c_r(i)x(i+f_1-k)C(j)c_r(j)x^*(j+f_2-l)$$

$$(1 - \delta_{c_r,c_t}\delta_{k,f_1})(1 - \delta_{c_r,c_t}\delta_{l,f_2}) =$$

$$\frac{1}{SF_{c_r}^2} \sum_{\substack{k,l \\ i,j}} h(k)h^*(l)C^*(i)c_r(i)C(i+f_1-k)c_t(i+f_1-k)$$

$$s\left(\left\lfloor \frac{i+f_1-k}{SF_{c_t}} \right\rfloor\right)C(j)c_r(j)C^*(j+f_2-l)c_t(j+f_2-l)$$

$$s\left(\left\lfloor \frac{j+f_2-l}{SF_{c_t}} \right\rfloor\right)(1 - \delta_{c_r,c_t}\delta_{k,f_1})(1 - \delta_{c_r,c_t}\delta_{k,f_2})$$

According to the classical impairment assumptions, the only non-vanishing correlation is:

$$E(C^*(i)C(i+f_1-k)C(j)C^*(j+f_2-l))=1 \text{ for } i=j, l=k+f_2-f_1 \quad (B7)$$

The expectation value E here is actually taken over all scrambling code offsets (always even). This gives:

$$E(e(f_1)e^*(f_2))SF_{c_c}^2 = \quad (B8)$$

$$SF_{c_r} \sum_{k} h(k)h^*(k+f_2-f_1)(1 - \delta_{c_r,c_t}\delta_{k,f_1})\beta_s^2 ==$$

$$SF_{c_r}\left(\sum_{k} h(k)h^*(k+f_2-f_1) - h(f_1)h^*(f_2)\delta_{c_r,c_t}\right)\beta_s^2$$

A covariance matrix $R_u$ according to the classical impairment assumptions can thus be expressed as:

$$R_u = \frac{1}{SF}(R_y - \sigma_x^2 hh^H) \quad (B9)$$

where $$R_y(f_1, f_2) = \frac{1}{2SF_{c_c}} \sum_i \left( \sum_k h(k)h^*(k+f_2-f_1) - h(f_1)h^*(f_2)\delta_{c_r,c_t} \right) \beta(i)^2 \tag{B10}$$

According to the newly discovered impairment assumptions, the non-vanishing correlations are:

$$E(C^*(i)C(i+f_1-k)C(j)C^*(j+f_2-l)) = \tag{B11}$$

$$\begin{cases} 1 & i=j, l=k+f_2-f_1 \\ -1, & i=j+1, i=0,2,4,\ldots, \\ & k=f_1-1, l=f_2+1 \\ -1, & i=j-1, i=0,2,4,\ldots, \\ & k=f_1+1, l=f_2-1 \end{cases}$$

The first term above is the classical impairment. Using this renders in:

$$E(e(f_1)e^*(f_2))SF_{c_c}^2 = \tag{B12}$$

$$SF_{c_c} \sum_k h(k)h^*(k+f_2-f_1)(1-\delta_{c_r,c_t}\delta_{k,f_1})\beta_s^2 +$$

$$h(f_1+1)h^*(f_2-1) \sum_{i=0}^{SF_{c_r}-1} c_r(i-1)c_r(i)c_t(i-1)c_t(i)$$

$$E\left((C^*(i))^2(C(i-1))^2 s^*\left(\left\lfloor \frac{i}{SF_{c_t}}\right\rfloor\right) s\left(\left\lfloor \frac{i-1}{SF_{c_t}}\right\rfloor\right)\right) +$$

$$h(f_1-1)h^*(f_2+1) \sum_{i=0}^{SF_{c_r}-1} c_r(i)c_r(i+1)c_t(i+1)$$

$$c_t(i)E\left((C^*(i))^2(C(i+1))^2 s^*\left(\left\lfloor \frac{i}{SF_{c_t}}\right\rfloor\right) s\left(\left\lfloor \frac{i+1}{SF_{c_t}}\right\rfloor\right)\right) ==$$

$$SF_{c_c} \left( \sum_k h(k)h^*(k+f_2-f_1) - h(f_1)h^*(f_2)\delta_{c_r,c_t} \right) \beta_s^2 +$$

$$-h(f_1+1)h^*(f_2-1)\beta_s^2 \sum_{k=0}^{\frac{SF_{c_r}}{2}-1} c_r(2k)c_r(2k+1)$$

$$c_t(2k)c_t(2k+1) ++ h(f_1-1)h^*(f_2+1)$$

$$\beta_s^2 \sum_{k=0}^{\frac{SF_{c_r}}{2}-1} c_r(2k)c_r(2k+1)c_t(2k)c_t(2k+1) =$$

$$\beta_s^2 SF_{c_c} \sum_k h(k)h^*(k+f_2-f_1)(1-\delta_{c_r,c_t}\delta_{k,f_1}) +$$

$$-\beta_s^2 (h(f_1+1)h^*(f_2-1) + h(f_1-1)h^*(f_2+1))$$

$$\frac{SF_{c_c}}{2} \text{sign}(c_r, c_t) ==$$

$$SF_{c_c} \left( \sum_k h(k)h^*(k+f_2-f_1) - h(f_1)h^*(f_2)\delta_{c_r,c_t} \right) \beta_s^2 +$$

$$-(h(f_1+1)h^*(f_2-1) + h(f_1-1)h^*(f_2+1))\frac{SF_{c_c}}{2}\text{sign}(c_r, c_t)\beta_s^2$$

where $$\text{sign}(c_r, c_t) = \begin{cases} 1, & \text{the codes are from the same code tree} \\ -1, & \text{the codes are from different code tree} \end{cases} \tag{B13}$$

Thus if the UE is transmitting on several data channels with OVSF codes $\{c_t^i\}$, and beta factors $\{\beta^i\}$ and using OVSF code $c_r$ in the GRake+ or the unused code to estimate the impairment matrix, then the last term in (B9) becomes the correction term:

$$R_u^{corr}(f_1, f_2) = -(h(f_1+1)h^*(f_2-1) + h(f_1-1)h^*(f_2+1)) \tag{B14}$$

$$\frac{1}{2SF_{c_r}} \sum_i \text{sign}(c_r, c_t^i)\beta^{i^2}.$$

Note that other UE's or noise does not contribute to this term. Here also the fact that the data on different data channels are uncorrelated is used. If other users (MUI) are added, the noise relation (B9) becomes:

$$R_u = \frac{1}{SF_{c_r}}(R_y - \sigma_x^2 hh^H) + R_u^{corr}. \tag{B15}$$

Thus if impairment is estimated using a code on the same OVSF sub-tree as the used code on the data being detected the correction is the same, and nothing need to be done, except the scaling with the spreading factor. However, if the codes are from different OVSF branches, then the impairment matrix should be corrected with the double quantity ($c_r$ is the OVSF code of the data to be detected):

$$R_u^{corr}(f_1, f_2) = -(h(f_1+1)h^*(f_2-1) + h(f_1-1)h^*(f_2+1)) \tag{B16}$$

$$\frac{1}{SF_{c_r}} \sum_i \text{sign}(c_r, c_t^i)\beta^{i^2}.$$

In a typical High Data Rate (HDR) example, data is sent on 2×SF2+2SF4 and the impairment is estimated using code 13.1. Then there is no need to compensate the impairment when applying the GRake on the SF4 data. However, since SF2 is situated on the other OSVF sub-tree, it needs to be compensated by (neglecting control channels):

$$R_u^{corr}(f_1, f_2) = -(h(f_1+1)h^*(f_2-1) + h(f_1-1)h^*(f_2+1))\frac{1}{2}\beta^{SF4^2}. \tag{B17}$$

since $$\sum_i \text{sign}(c_r, c_t^i)\beta^{i^2} \approx -\beta^{SF4^2} + \beta^{SF2^2} = \beta^{SF4^2}. \tag{B18}$$

The fact that the $\beta^2$ factor for SF2 is twice that of SF4 was here used. If only SF2 data is sent and the control channels are neglected, then the correction is twice the size:

$$R_u^{corr}(f_1,f_2) = -(h(f_1+1)h^*(f_2-1) + h(f_1-1)h^*(f_2+1))$$
$$\beta^{SF4^2}. \tag{B19}$$

Appendix C

LMMSE

A covariance matrix $R_u$ according to the classical impairment assumptions can be expressed (c.f. B9):

$$R_u = \frac{1}{SF}(R_y - \sigma_x^2 h h^H) \quad (C1)$$

The autocorrelation matrix $R_y$ is the adequate term for LMMSE, and is estimated using the autocorrelation function of the antenna signal.

Taking the correlation properties (10a-b) into account, gives a corresponding relation (B15), in which a correction term appears. Since LMMSE is performed before despreading, the correction term can also be formulated as a correction term $R_y^{corr}$ to the $R_y$ matrix instead:

$$R_u = \frac{1}{SF_{c_r}}(R_y + R_y^{corr} - \sigma_x^2 h h^H). \quad (C2)$$

The term $R_y^{corr}$ thus becomes:

$$R_y^{corr}(f_1, f_2) = \quad (C3)$$
$$-(h(f_1+1)h^*(f_2-1) + h(f_1-1)h^*(f_2+1))\frac{1}{2}\sum_i \text{sign}(c_r, c_t^i)\beta^{i2}$$

and $c_r$ is the channelization code to be used in the subsequent despreading process, and $c_t^i$ are the used channelization codes.

Thus, to use the chip level LMMSE and take the despreading correlation into account, the autocorrelation should be compensated with $R_y^{corr}$. With this compensation, the modified LMMSE becomes equivalent to the GRake with correct impairment matrix. LMMSE and GRake are equivalent only if the hypothesis of random codes is true.

The invention claimed is:

1. A method for equalizing a received radio signal in a Wideband Code Division Multiple Access system, comprising the steps of:
    receiving, in a radio receiver, a digital radio signal spread by scrambling codes;
    performing a channel estimation on said received digital radio signal for a plurality of channels; and
    equalizing said received digital radio signal, in an equalizer, into an equalized digital radio signal, by combining a plurality of part signals, deduced from said digital radio signal, with a respective delay and a respective combining weight,
    wherein
    said step of equalizing comprises provision of said combining weights based on a signal impairment matrix having elements compensated for systematic colouring caused by said scrambling codes.

2. The method according to claim 1, wherein said digital radio signal spread by scrambling codes is an uplink signal.

3. The method according to claim 1, wherein said elements in said impairment matrix are compensated for fourth order moments of said scrambling codes.

4. The method according to claim 1, further comprising the step of performing a searching of said respective delays for said plurality of channels.

5. The method according to claim 1, further comprising the step of performing a determination of β factors for channels in said digital radio signal, whereby said elements in said signal impairment matrix are based on said β factors.

6. The method according to claim 1, wherein said step of equalizing is a symbol-level equalizing, whereby said step of equalizing in turn comprises the steps of:
    dividing said received digital signal in said plurality of part signals, representing a respective channel of said plurality of channels;
    delaying each part signal by said respective delay into delayed part signals;
    calculating said respective combining weights as a product of said channel estimations and an inverse of said signal impairment matrix;
    despreading each part signal into a symbol-level part signal by a first spreading code; and
    combining said symbol-level part signals with said respective combining weights into said equalized digital radio signal.

7. The method according to claim 6, wherein said step of calculating comprises despreading each part signal with a second spreading code of a control channel comprising a pilot signal, estimating a pilot impairment matrix having elements compensated for systematic colouring caused by said scrambling codes and modifying said pilot impairment matrix into said signal impairment matrix in dependence on said first and second spreading factors.

8. The method according to claim 6, wherein said step of calculating comprises despreading each part signal with a second spreading code of an unused channel, estimating a noise impairment matrix having elements compensated for systematic colouring caused by said scrambling codes and modifying said noise impairment matrix into said signal impairment matrix in dependence on whether said first and second spreading factors are present in a same orthogonal variable spreading factor sub-tree or not.

9. The method according to claim 1, wherein said step of equalizing is a chip-level equalizing, whereby said step of equalizing in turn comprises the steps of:
    filtering said received digital signal into an equalized chip signal, minimizing a distortion by use of a least minimum mean square error approach;
    calculating said respective combining weight for each chip-level part signal as a product of said channel estimations and an inverse of said signal impairment matrix;
    said step of calculating comprises calculation of an autocorrelation impairment matrix using autocorrelation of said received digital signal;
    said step of calculating further comprises precompensating said autocorrelation impairment matrix into a signal impairment matrix by compensating a subsequently appearance of systematic colouring that will be caused by the scrambling codes in a subsequent despreading procedure; and
    despreading said equalized chip signal to a symbol-level by a first spreading code, giving said equalized digital radio signal.

10. A radio receiver arrangement in a Wideband Code Division Multiple Access system, comprising:
    a radio receiver, configured for receiving a digital radio signal spread by scrambling codes; and an equalizer, connected to said radio receiver, and comprising an equalizer core, a channel estimator and a combining weight estimator;

said equalizer core configured for combining a plurality of part signals, deduced from said digital radio signal, with a respective delay and a respective combining weight, into an equalized digital radio signal wherein said combining weight estimator is configured for providing said combining weights to said equalizer core, said combining weights being based on a signal impairment matrix having elements compensated for systematic colouring caused by said scrambling codes.

11. The radio receiver arrangement according to claim 10, wherein said combining weight estimator is configured for compensating said elements in said impairment matrix for fourth order moments of said scrambling codes.

12. The radio receiver arrangement according to claim 10, wherein said equalizer further comprises a channel searcher, configured for searching for said respective delays for said plurality of channels.

13. The radio receiver arrangement according to claim 10, wherein said equalizer further comprises a β factor determiner, configured for performing a determination of β actors for channels in said digital radio signal.

14. The radio receiver arrangement according to claim 10, wherein said equalizer is a symbol-level equalizer;

said equalizer core comprising:
- a divider, configured for dividing said received digital signal in said plurality of part signals;
- a delay filter, configured for delaying each part signal by said respective delay into delayed part signals;
- a despreader arrangement, configured for despreading each delayed part signal into a symbol-level part signal by a first spreading code; and
- a combiner, combining said symbol-level part signals with said respective combining weights into said equalized digital radio signal.

15. The radio receiver arrangement according to claim 14, wherein:

said combining weight estimator further comprises an estimator despreader, configured for despreading each part signal with a second spreading code of a control channel comprising a pilot signal;

said combining weight estimator further configured for estimating a pilot impairment matrix having elements compensated for systematic colouring caused by said scrambling codes; and said combining weight estimator further configured for modifying said pilot impairment matrix into said signal impairment matrix in dependence on said first and second spreading factors.

16. The radio receiver arrangement according to claim 14, wherein:

said combining weight estimator further comprises an estimator despreader, configured for despreading each part signal with a second spreading code of an unused channel;

said combining weight estimator further configured for estimating a noise impairment matrix having elements compensated for systematic colouring caused by said scrambling codes; and said combining weight estimator further configured for modifying said noise impairment matrix into said signal impairment matrix in dependence on whether said first and second spreading factors are present in a same orthogonal variable spreading factor sub-tree or not.

17. The radio receiver arrangement according to claim 10, wherein said equalizer is a chip-level equalizer;

said equalizer core comprising:
- a filter, configured for filtering said received digital signal into equalized chip signal, minimizing a distortion by use of a least minimum mean square error approach;

said combining weight estimator further configured for calculating of said respective combining weight for each chip-level part signal as a product of said channel estimations and an inverse of said signal impairment matrix;

said combining weight estimator further configured for calculation of an autocorrelation impairment matrix using autocorrelation of said received digital signal;

said combining weight estimator further configured for precompensating said autocorrelation impairment matrix into a signal impairment matrix by compensating a subsequently appearance of systematic colouring that will be caused by the scrambling codes in a subsequent despreading procedure; and said equalizer core further comprising a despreader arrangement, configured for despreading said equalized chip signal to a symbol-level by a first spreading code, giving said equalized digital radio signal.

18. A radio base station comprising a radio receiver arrangement according to claim 10.

* * * * *